US008582180B2

(12) United States Patent
Miura

(10) Patent No.: US 8,582,180 B2
(45) Date of Patent: Nov. 12, 2013

(54) IMAGE FORMING APPARATUS AND IMAGE FORMING METHOD WITH IMAGE DENSITY CORRECTION

(75) Inventor: Hiroshi Miura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 844 days.

(21) Appl. No.: 12/394,274

(22) Filed: Feb. 27, 2009

(65) Prior Publication Data

US 2009/0231604 A1 Sep. 17, 2009

(30) Foreign Application Priority Data

Mar. 12, 2008 (JP) ................................ 2008-062918

(51) Int. Cl.
*H04N 1/407* (2006.01)

(52) U.S. Cl.
USPC ......................................... 358/3.01; 358/521

(58) Field of Classification Search
None
See application file for complete search history.

(56) References Cited

U.S. PATENT DOCUMENTS

| | | | | |
|---|---|---|---|---|
| 5,873,010 | A | 2/1999 | Enomoto et al. | |
| 6,185,007 | B1 * | 2/2001 | Hayashi et al. | 358/1.9 |
| 6,204,873 | B1 * | 3/2001 | Shimazaki | 347/172 |
| 2003/0058460 | A1 * | 3/2003 | Denton et al. | 358/1.9 |
| 2005/0088672 | A1 * | 4/2005 | Johnson | 358/1.9 |
| 2005/0260004 | A1 * | 11/2005 | Maebashi et al. | 399/15 |
| 2006/0171001 | A1 * | 8/2006 | Kitagawa et al. | 358/521 |
| 2007/0127940 | A1 * | 6/2007 | Zaima | 399/53 |
| 2008/0218778 | A1 * | 9/2008 | Kusunoki | 358/1.9 |

FOREIGN PATENT DOCUMENTS

| | | | |
|---|---|---|---|
| JP | 07098528 | A | 4/1995 |
| JP | 2004-258281 | A | 9/2004 |
| JP | 2005-091767 | A | 4/2005 |
| JP | 2007062208 | A | 3/2007 |

* cited by examiner

*Primary Examiner* — Barbara Reinier
(74) *Attorney, Agent, or Firm* — Panitch Schwarze Belisario & Nadel LLP

(57) ABSTRACT

An image forming apparatus having an image forming unit forming a gradation image includes density detection, gradation correction, and mechanism control units. The density detection unit detects gradation image density. The gradation correction control unit controls a change of gradation characteristic. The mechanism control unit controls the image forming unit and a change of image density, and includes density difference calculation and comparison judging units. The density difference calculation unit calculates density difference between target image density and the image density. The comparison judging unit compares the density difference with reference value and judges the image density to change and the gradation correction unit to operate where the density difference exceeds the reference value, or judges the gradation correction unit to operate where the density difference is below the reference value. The mechanism control unit controls the change of image density and the gradation correction unit according to judgment result.

22 Claims, 26 Drawing Sheets

70

| | K | Y | M | C |
|---|---|---|---|---|
| 30% | $KD_{30}$ | $YD_{30}$ | $MD_{30}$ | $CD_{30}$ |
| 70% | $KD_{70}$ | $YD_{70}$ | $MD_{70}$ | $CD_{70}$ |
| 100% | $KD_{100}$ | $YD_{100}$ | $MD_{100}$ | $CD_{100}$ |

FIG. 8

82

| | K | Y | M | C |
|---|---|---|---|---|
| 30% | $\Delta KDB(A)_{30}$ | $\Delta YDB(A)_{30}$ | $\Delta MDB(A)_{30}$ | $\Delta CDB(A)_{30}$ |
| 70% | $\Delta KDB(A)_{70}$ | $\Delta YDB(A)_{70}$ | $\Delta MDB(A)_{70}$ | $\Delta CDB(A)_{70}$ |
| 100% | $\Delta KDB(A)_{100}$ | $\Delta YDB(A)_{100}$ | $\Delta MDB(A)_{100}$ | $\Delta CDB(A)_{100}$ |

FIG. 9

83

| | K | Y | M | C |
|---|---|---|---|---|
| 30% | $\Delta KDK(A)_{30}$ | $\Delta YDK(A)_{30}$ | $\Delta MDK(A)_{30}$ | $\Delta CDK(A)_{30}$ |
| 70% | $\Delta KDK(A)_{70}$ | $\Delta YDK(A)_{70}$ | $\Delta MDK(A)_{70}$ | $\Delta CDK(A)_{70}$ |
| 100% | $\Delta KDK(A)_{100}$ | $\Delta YDK(A)_{100}$ | $\Delta MDK(A)_{100}$ | $\Delta CDK(A)_{100}$ |

FIG. 10

71

| | K | Y | M | C |
|---|---|---|---|---|
| 30% | $KODB_{30}$ | $YODB_{30}$ | $MODB_{30}$ | $CODB_{30}$ |
| 70% | $KODB_{70}$ | $YODB_{70}$ | $MODB_{70}$ | $CODB_{70}$ |
| 100% | $KODB_{100}$ | $YODB_{100}$ | $MODB_{100}$ | $CODB_{100}$ |

FIG. 11

72

| | K | Y | M | C |
|---|---|---|---|---|
| 30% | $KODK_{30}$ | $YODK_{30}$ | $MODK_{30}$ | $CODK_{30}$ |
| 70% | $KODK_{70}$ | $YODK_{70}$ | $MODK_{70}$ | $CODK_{70}$ |
| 100% | $KODK_{100}$ | $YODK_{100}$ | $MODK_{100}$ | $CODK_{100}$ |

| | C |
|---|---|
| 30% | $CD_{30}'=0.40$ |
| 70% | $CD_{70}'=1.50$ |
| 100% | $CD_{100}'=1.80$ |

FIG. 17

| | C |
|---|---|
| 30% | $CD_{30}$=0.50 |
| 70% | $CD_{70}$=1.60 |
| 100% | $CD_{100}$=2.00 |

FIG. 18

| | C |
|---|---|
| 30% | $\Delta CDB(A)_{30}$=−50 |
| 70% | $\Delta CDB(A)_{70}$=−40 |
| 100% | $\Delta CDB(A)_{100}$=−20 |

FIG. 19

| | C |
|---|---|
| 30% | $CD_{30}$"=0.48 |
| 70% | $CD_{70}$"=1.61 |
| 100% | $CD_{100}$"=2.01 |

FIG. 20

| | C |
|---|---|
| 30% | $\Delta CDK(A)_{30}=40$ |
| 70% | $\Delta CDK(A)_{70}=20$ |
| 100% | $\Delta CDK(A)_{100}=40$ |

FIG. 21

| | C |
|---|---|
| 30% | $CODB_{30}=1$ |
| 70% | $CODB_{70}=2$ |
| 100% | $CODB_{100}=3$ |

FIG. 22

| | C |
|---|---|
| 30% | $CODK_{30}=2$ |
| 70% | $CODK_{70}=3$ |
| 100% | $CODK_{100}=1$ |

FIG. 25

| DUTY | GRADATION LEVEL | DENSITY VALUE |
|---|---|---|
| 0% | 0 | 0.00 |
| : | : | : |
| 20% | 51 | 0.33 |
| : | : | : |
| 40% | 102 | 0.65 |
| : | : | : |
| 60% | 153 | 0.98 |
| : | : | : |
| 80% | 204 | 1.30 |
| : | : | : |
| 100% | 255 | 1.50 |

FIG. 26

87

| GRADATION LEVEL | DENSITY VALUE |
|---|---|
| 0 | 0.00 |
| : | : |
| 51 | 0.30 |
| : | : |
| 60 | 0.33 |
| : | : |
| 102 | 0.60 |
| : | : |
| 115 | 0.65 |
| : | : |
| 153 | 0.90 |
| : | : |
| 165 | 0.98 |
| : | : |
| 204 | 1.20 |
| : | : |
| 230 | 1.30 |
| : | : |
| 255 | 1.50 |

FIG. 28

84

| INPUT GRADATION LEVEL | OUTPUT GRADATION LEVEL |
|---|---|
| 0 | 0 |
| : | : |
| 51 | 60 |
| : | : |
| 102 | 115 |
| : | : |
| 153 | 165 |
| : | : |
| 204 | 230 |
| : | : |
| 255 | 255 |

FIG. 29

85

| DUTY | K | Y | M | C |
|---|---|---|---|---|
| 20% | $KOD_{20}$ | $YOD_{20}$ | $MOD_{20}$ | $COD_{20}$ |
| 40% | $KOD_{40}$ | $YOD_{40}$ | $MOD_{40}$ | $COD_{40}$ |
| 60% | $KOD_{60}$ | $YOD_{60}$ | $MOD_{60}$ | $COD_{60}$ |
| 80% | $KOD_{80}$ | $YOD_{80}$ | $MOD_{80}$ | $COD_{80}$ |
| 100% | $KOD_{100}$ | $YOD_{100}$ | $MOD_{100}$ | $COD_{100}$ |

| DUTY | K | Y | M | C |
|---|---|---|---|---|
| 20% | $KOD_{20}'$ | $YOD_{20}'$ | $MOD_{20}'$ | $COD_{20}'$ |
| 40% | $KOD_{40}'$ | $YOD_{40}'$ | $MOD_{40}'$ | $COD_{40}'$ |
| 60% | $KOD_{60}'$ | $YOD_{60}'$ | $MOD_{60}'$ | $COD_{60}'$ |
| 80% | $KOD_{80}'$ | $YOD_{80}'$ | $MOD_{80}'$ | $COD_{80}'$ |
| 100% | $KOD_{100}'$ | $YOD_{100}'$ | $MOD_{100}'$ | $COD_{100}'$ |

86

IMAGE FORMING APPARATUS AND IMAGE FORMING METHOD WITH IMAGE DENSITY CORRECTION

BACKGROUND OF THE INVENTION

1. Field of the Invention

The present invention relates to an image forming apparatus and to a method for forming an image by the image forming apparatus.

2. Description of Related Art

A related art multi-color image forming apparatus such as a multi-color electrophotographic printer includes plural process units each of which has, for example, a photoreceptor, a charging mechanism, an exposure mechanism, and a development mechanism. The related art multi-color image forming apparatus employing a tandem system, for example, includes four of such process units disposed therein. The four process units serve as image forming mechanisms of respective colors of black, yellow, magenta, and cyan, thereby sequentially transferring toner images of respective colors on a sheet being electrostatically absorbed and conveyed on the conveyance belt.

By such a related art image forming apparatus, print density may vary due to a change of sensitivity of the photoreceptor or chargeability of the toner over time or due to atmosphere temperature or humidity therein. Consequently, the print density is detected at a prescribed timing at which, for example, a power source of the image forming apparatus is activated or a prescribed number of sheets are printed, so as to perform the density correction.

In such a related art image forming apparatus, a density detection pattern used for the density correction is printed on the conveyance belt, and density of the density detection pattern is read by a density detection mechanism. According to a result provided by the density detection mechanism, a physical characteristic (e.g., development voltage, exposure time) of an engine unit of the image forming apparatus is adjusted, so that the density correction is performed, thereby enhancing stability of the print density. Such a density correction is disclosed in Japanese Un-examined Patent Application Publication No. 2004-258281, for example.

Moreover, the density detection pattern is printed on the conveyance belt, and the density of the density detection pattern is detected by the density detection mechanism in a state that the above density correction result is added. A density value detected by the density detection mechanism is notified to an image processing unit of the image forming apparatus. The image processing unit corrects the density based on a difference between the density value notified and a target density value (such a correction is hereafter referred to as a gradation correction), thereby enhancing stability of the print density. In such an image forming apparatus, the density correction process is executed by correcting the physical characteristic of the engine unit thereof and performing the gradation correction by the image processing unit based on the correction result of the physical characteristic.

In a mechanism adjusting the physical characteristic of the engine unit of such an image forming apparatus, for example, each of a voltage correction adjusting development voltage and a light amount correction adjusting an exposure time and the like of an exposure device is executed. When one of such corrections is completed, the density detection pattern is again outputted and detected to perform another one of the corrections, causing prolongation of the time in an amount of outputting and detecting the density detection pattern plural times.

BRIEF SUMMARY OF THE INVENTION

According to one aspect of the invention, an image forming apparatus having an image forming unit capable of forming a gradation image, the image forming apparatus includes: a density detection unit detecting gradation image density of the gradation image formed by the image forming unit; a gradation correction control unit controlling a change of a gradation characteristic according to a detection result of the density detection unit; and a mechanism control unit controlling operation of the image forming unit and controlling a change of image density according to the detection result of the density detection unit. The mechanism control unit includes: a density difference calculation unit calculating a density difference between target image density of an image to be formed by the image forming unit and the image density; and a comparison judging unit comparing the density difference calculated by the density difference calculation unit with a reference value serving as a prescribed range value based on the target image density of the image density, and judging the image density to change and the gradation correction unit to operate where the density difference is greater than or equal to the reference value or judging the gradation correction unit to operate where the density difference is below the reference value. The mechanism control unit controls the change of the image density and the operation of the gradation correction unit according to a judgment result of the comparison judging unit.

According to another aspect of the present invention, a method for forming an image includes the steps of: printing a prescribed density detection pattern; detecting a density detection value from the prescribed density detection pattern printed; calculating a density difference between the density detection value and a target value; comparing the density difference calculated with a reference value serving as a prescribed range value based on the target value; and correcting density according to a comparison result of the comparing step.

The present invention provides an image forming apparatus capable of operating a gradation correction unit without operation of a density correction unit where a deviation between the actual print density and a target print density is within a prescribed range, that is, a density difference is below a reference value based on a comparison result of a comparison judging unit. Therefore, an adjustment of each of engine units in the image forming apparatus to be executed in the course of normal density correction can be omitted, so that a density adjustment is provided in a short time period. Moreover, the image forming apparatus can reduce a number of printing times of a gradation pattern for density detection, so that not only the process time is shortened but also energy is saved, thereby saving developer such as toner.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein:

FIG. 8 is a schematic diagram illustrating a table of a development voltage value adjustment amount of the image forming apparatus according to the first embodiment of the present invention;

FIG. 9 is a schematic diagram illustrating a table of an LED driving time adjustment amount of the image forming apparatus according to the first embodiment of the present invention;

FIG. 10 is a schematic diagram illustrating a table of a weighting coefficient of a development voltage control amount of the image forming apparatus according to the first embodiment of the present invention;

FIG. 11 is a schematic diagram illustrating a table of a weighting coefficient of an LED driving time control amount of the image forming apparatus according to the first embodiment of the present invention;

FIG. 17 is a schematic diagram illustrating a table regarding the output expectation value of the density sensor of the image forming apparatus according to the first embodiment of the present invention;

FIG. 18 is a schematic diagram illustrating a table regarding the development voltage value adjustment amount of the image forming apparatus according to the first embodiment of the present invention;

FIG. 19 is a schematic diagram illustrating another table regarding the output voltage value of the density sensor of the image forming apparatus according to the first embodiment of the present invention;

FIG. 20 is a schematic diagram illustrating a table regarding the LED driving time adjustment amount of the image forming apparatus according to the first embodiment of the present invention;

FIG. 21 is a schematic diagram illustrating a table regarding the weighting coefficient of the development voltage control amount of the image forming apparatus according to the first embodiment of the present invention;

FIG. 22 is a schematic diagram illustrating a table regarding the weighting coefficient of the LED driving time control amount of the image forming apparatus according to the first embodiment of the present invention;

FIG. 25 is a schematic diagram illustrating data of the DUTY, a gradation level, and a density value in the image forming apparatus according the first embodiment of the present invention in a table format;

FIG. 26 is a schematic diagram illustrating data of the gradation level and the density value of the image forming apparatus according to the first embodiment of the present invention in a table format;

FIG. 28 is a schematic diagram explaining the gradation correction in the image forming apparatus according to the first embodiment of the present invention and illustrating correspondence between an input gradation level and an output gradation level;

FIG. 29 is a schematic diagram illustrating a table regarding target print density data of the image forming apparatus according to the first embodiment of the present invention;

DETAILED DESCRIPTION OF PREFERRED EMBODIMENTS

Figure 1:
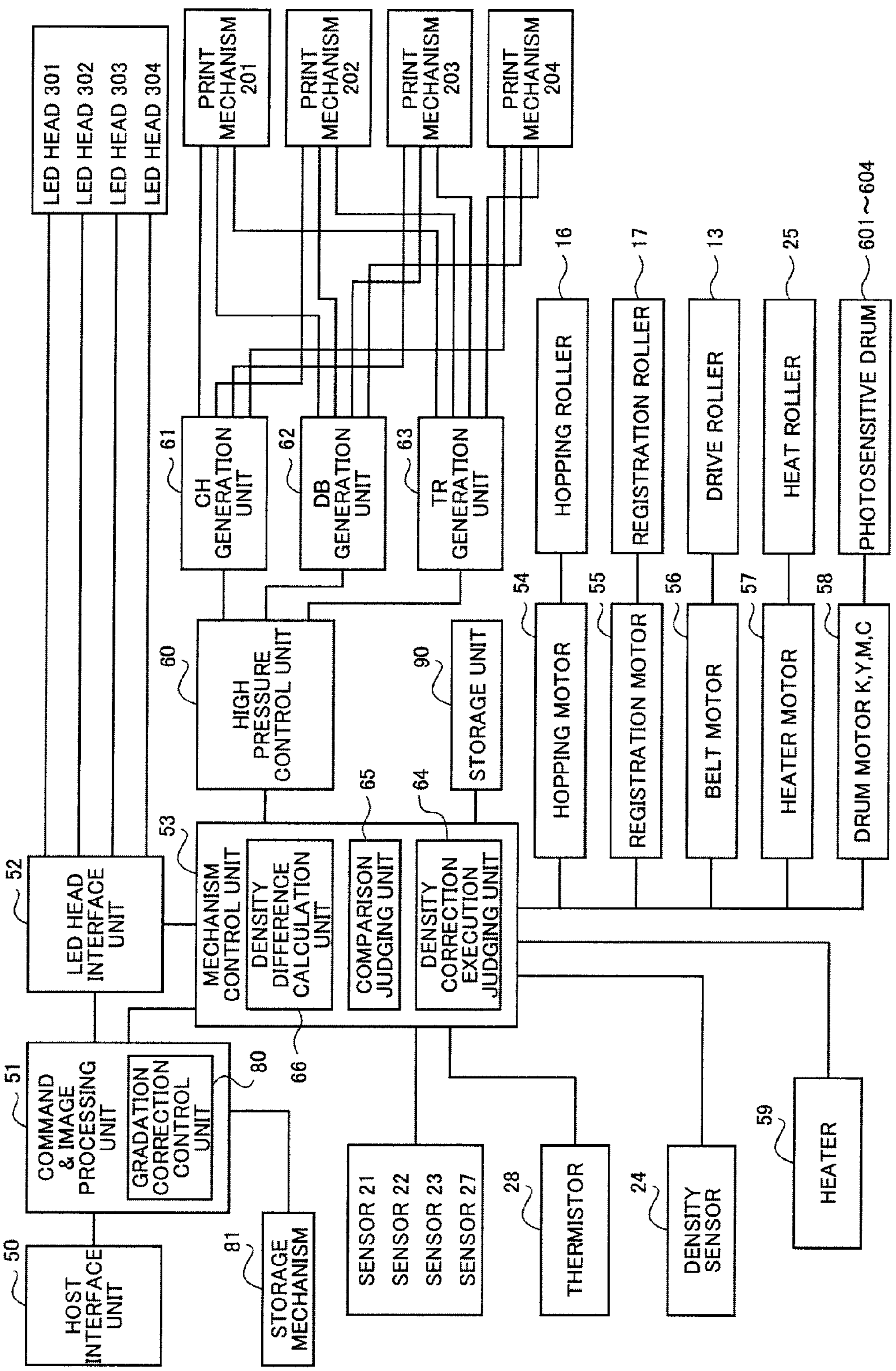
FIG. 1 is a block diagram illustrating a control system of an image forming apparatus according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, like reference numerals designate identical or corresponding parts throughout the several views.

First Embodiment

An image forming apparatus 1 according to a first embodiment of the present invention includes an electrophotographic print mechanism having a light emitting diode (LED) serving as an exposure device. A control circuit and configurations of the image forming apparatus 1 according to the first embodiment of the present invention are illustrated in a block diagram of FIG. 1 (described later) and a schematic diagram of FIG. 2 (described later), respectively. According to the first embodiment, the image forming apparatus 1 serves as a printer. However, the image forming apparatus 1 may serve as a multi-functional peripheral having functions of a facsimile communication and a scanner, for example, and may serve as a part of a photocopier or a facsimile machine.

Figure 2:
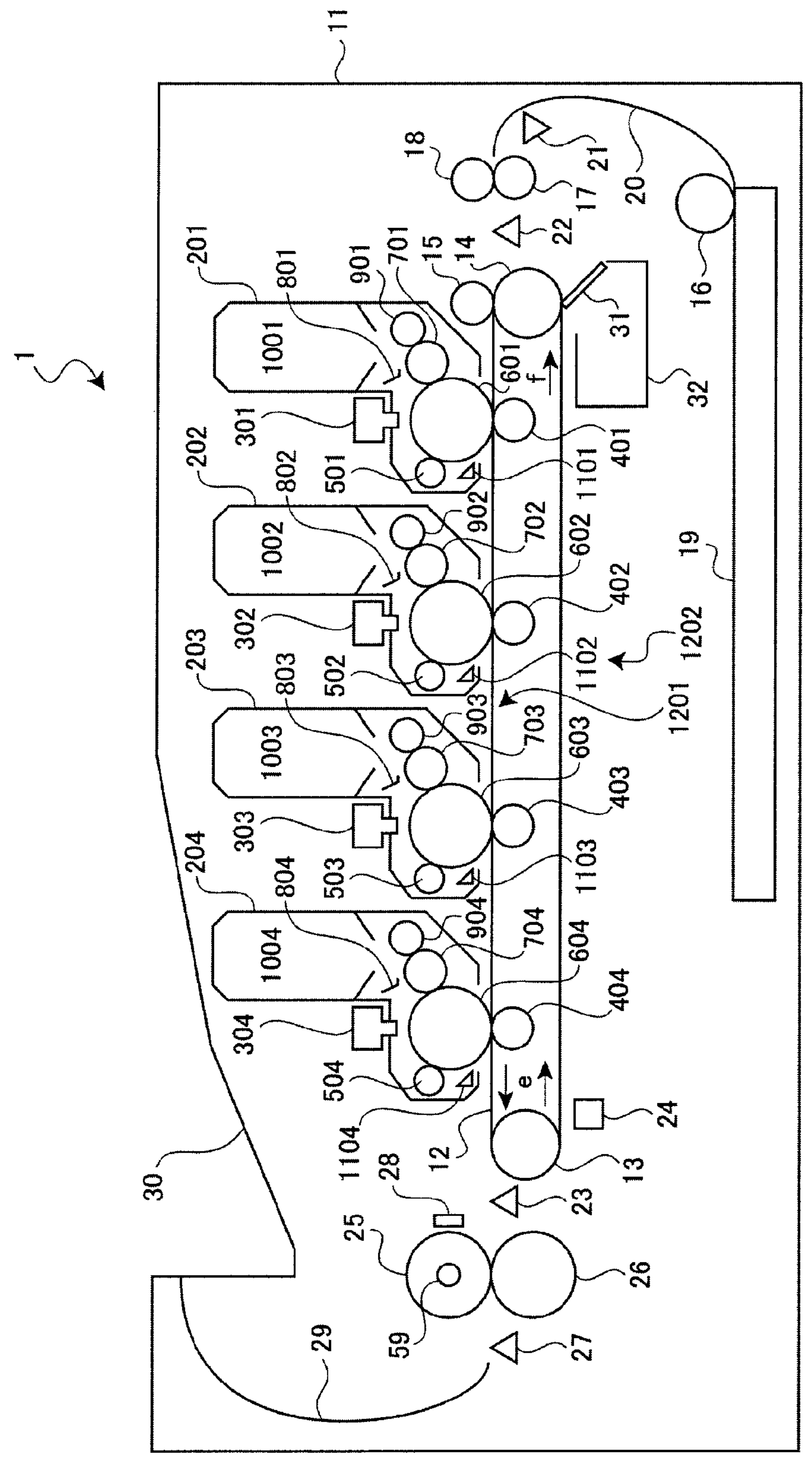
FIG. 2 is a schematic diagram illustrating the image forming apparatus according to the first embodiment of the present invention.

Referring to FIG. 2, the image forming apparatus 1 is illustrated in the schematic diagram. A housing 11 of the image forming apparatus 1 includes four print mechanisms (also referred to as image drum units) 201, 202, 203, and 204 serving as process units corresponding to four colors of black (K), yellow (Y), magenta (M), and cyan (C), respectively. The print mechanisms 201, 202, 203, and 204 are disposed along a conveyance path having a conveyance belt 12 on which a recording media such as a sheet is conveyed from an insertion side toward an ejection side.

The print mechanisms 201, 202, 203, and 204 record images of black, yellow, magenta, and cyan, respectively. The print mechanisms 201, 202, 203, and 204 respectively include: charging rollers 501, 502, 503, and 504; photosensitive drums 601, 602, 603, and 604; development roller 701, 702, 703, 704; development blades 801, 802, 803, and 804; sponge rollers 901, 902, 903, and 904; discharge light sources 1101, 1102, 1103, and 1104 discharging surfaces of the photosensitive drums 601, 602, 603, and 604; and toner cartridges 1001, 1002, 1003, and 1004 supplying toner serving as developer. The charging roller 501, 502, 503, and 504 charge the surfaces of the photosensitive drums 601, 602, 603, and 604, respectively. The developer rollers 701 through 704, the development blades 801 through 804, the sponge rollers 901 through 904, the discharge light sources 1101 through 1104, and the toner cartridges 1001 through 1004 form development units forming toner images.

Since each of the print mechanism 201, 202, 203, and 204 are substantially similar to one another except for the color of the toner, the print mechanism 201 is used as representative of all the print mechanisms 201, 202, 203, and 204 to describe the development unit of black, and a description of the development units of yellow, magenta, and cyan is omitted for the sake of simplicity. The toner supplied from the toner cartridge 1001 becomes a thin layer on the circumference of the development roller 701 by the development blade 801 through the sponge roller 901, and reaches a contact surface with the photosensitive drum 601. The toner is frictionally charged by the development roller 701 and the sponge roller 901 in a course of forming the thin layer. The development blade 801 allows an appropriate amount of the toner to be conveyed to the development roller 701 and scrapes excess toner.

LED heads 301, 302, 303, and 304 are disposed in positions above and opposite to the photosensitive drums 601, 602, 603, and 604 of the print mechanisms 201, 202, 203, and 204, respectively. Each of the LED heads 301, 302, 303, and 304 includes an LED array, a substrate (not shown) having a register group holding a drive IC (not shown) and data (not shown) driving the LED array, and a selfoc lens array (not shown) gathering light of the LED array, thereby allowing the LED array to emit the light in response to image data input from an interface unit. A black image signal is input to the LED head 301 among multi-color image signals. Similarly, a yellow image signal, a magenta image signal, and a cyan image signal are input to the LED heads 302, 303, and 303, respectively. The surface of the photosensitive drum 601 is exposed to the light emitted from the LED head 301, so that an electrostatic latent image corresponding to the image data signal is formed on the surface of the photosensitive drum 601. The toner on the circumference of the development roller 701 is electrostatically adhered to the electrostatic latent image, thereby forming the image. The cartridge 1001 of the print mechanism 201 includes the toner of black therein. Similarly, the cartages 1002, 1003, and 1004 of the print mechanism 202, 203, and 204 include the toners of yellow, magenta, and cyan, respectively. The conveyance belt 12 is movably disposed between the photosensitive drums 601, 602, 603, and 604 and transfer rollers 401, 402, 403, and 404. Each of the print mechanisms 202, 202, 203, and 204 and the conveyance belt 12 forms an image forming unit.

The conveyance belt 12 is made of a high-resistance semiconductive plastic film and is formed in an endless shape. A drive roller 13 is connected to a belt motor 56 and is rotated in a direction indicated by an arrow "e" shown in FIG. 2 by the belt motor 56. An upper surface portion 1201 of the conveyance belt 12 extends in portions between the photosensitive drums 601, 602, 603, and 604 of the print mechanisms 201, 202, 203, and 204 and respective transfer rollers 401, 402, 403, and 404. The conveyance belt 12 has a glossy surface.

As illustrated in FIG. 2, a sheet feeding mechanism supplying the sheet to the conveyance path is disposed in a lower right side of the image forming apparatus 1. The sheet feeding mechanism includes a hopping roller 16, a registration roller 17, and a sheet housing cassette 19. The sheet or sheets serving as the recording medium or media housed in the sheet housing cassette 19 is/are separately selected sheet by sheet by a separation mechanism such as a pickup roller (not shown), and each sheet is pulled out by the hopping roller 16. Subsequently, each sheet is guided by a guide member 20 and reaches the registration roller 17. Herein, in a case where the sheet is skewed (that is, the sheet is fed in an oblique state), a position of the skewed sheet is corrected by the registration roller 17 and a pinch roller 18 disposed in a position face to face with the registration roller 17. Subsequently, the sheet is led from the registration roller 17 to a portion between an absorbing roller 15 and the conveyance belt 12. The absorbing roller 15 presses and charges the sheet with a driven roller 14, and electrostatically absorbs the sheet on the upper surface portion 1201 of the conveyance belt 12. The driven roller 14 pulls the conveyance belt 12 in a direction indicated by an arrow "f" shown in FIG. 2 to impart prescribed tension to the conveyance belt 12.

Sensors 21 and 22 are disposed respectively in front and behind the registration roller 17 and detect the position of the sheet. A sensor 23 is disposed on a downstream side of the conveyance belt 12 on the side close to the drive roller 13 so as to check the sheet not separated from the conveyance belt 12 or detect a tailing end of the sheet.

The sheet separated from the conveyance belt 12 is led to a fixing mechanism including a heat roller 25 and a pressure roller 26 pressing the heat roller 25. The heat roller 25 is driven by a heater motor 57, and the pressure roller 26 is rotated as rotation of the heat roller 25. Such a heat roller 25 includes a heater 59, serving as a heat source, having a halogen lamp. As illustrated in FIG. 2, such a fixing mechanism is disposed at a downstream side in the sheet conveyance direction with respect to the sensor 23 disposed on the side close to the drive roller 13 of the conveyance belt 12, and applies heat to melt the toner on the sheet, thereby fixing the toner image on the sheet. A thermistor 28 is disposed in a vicinity of a surface of the heat roller 25 and monitors temperature of the heat roller 25.

An ejection sensor 27 is disposed on a downstream side of the heat roller 25 in the sheet conveyance direction, and monitors sheet jam or a sheet wrapped around the heat roller 25 in the fixing mechanism. A guide member 29 is disposed at a downstream side of the ejection sensor 27 in the sheet conveyance direction and conveys the sheet to a stacker 30 disposed on an upper portion of the housing 11 of the image forming apparatus 1, so that the sheet having the toner image printed thereon is ejected on the stacker 30.

A cleaning mechanism including a cleaning blade 31 and a waste toner tank 32 is disposed in a lower surface portion 1202 of the conveyance belt 12. The driven roller 14 and the cleaning blade 31 are disposed opposite to each other in such a manner as to sandwich the lower surface portion 1202 of the conveyance belt 12. The cleaning blade 31 is made of flexible rubber or plastic. The cleaning blade 31 scrapes residual remaining toner adhered in the upper surface portion 1201 from the surface of the conveyance belt 12 and drops to the waste toner tank 32.

Moreover, a density sensor 24 is disposed in a vicinity of the drive roller 13 and in a position opposite to the lower surface portion 1202 of the conveyance belt 12 as illustrated in FIG. 2. In the first embodiment, the density sensor 24 is a reflective light sensor having one system of light emission and two systems of light reception, and measures intensity of reflection light of a density detection pattern printed on the conveyance belt 12 to detect print density of the image forming apparatus 1.

Figure 3:
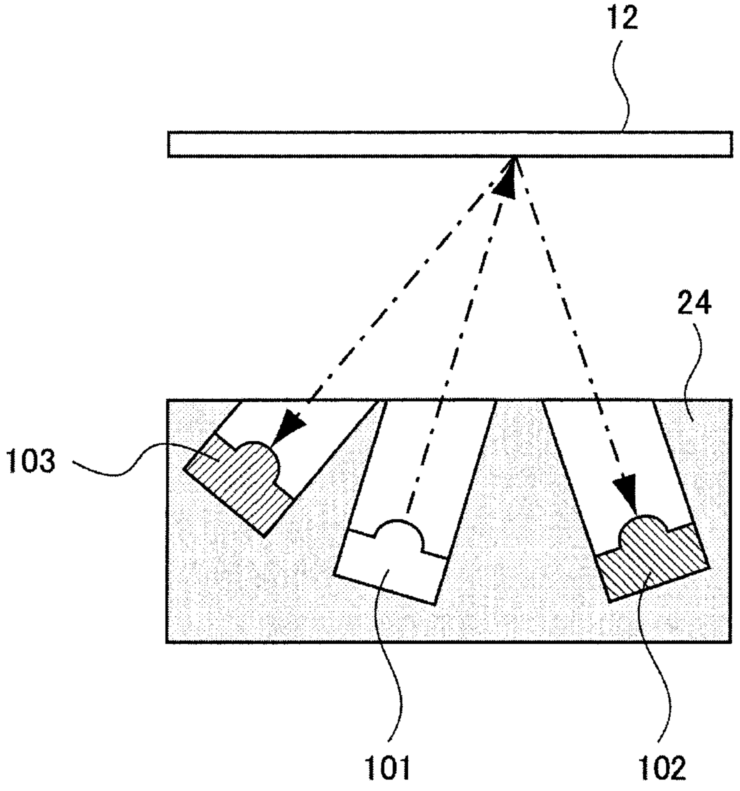
FIG. 3 is a schematic diagram illustrating a density sensor of the image forming apparatus according to the first embodiment of the present invention.

Referring to FIG. 3, the density sensor 24 is illustrated in a schematic diagram. The density sensor 24 includes an infrared-emitting diode (LED) 101, a phototransistor 102 for reception of specular reflection light, and a phototransistor 103 for reception of diffuse reflection light, thereby detecting both color density and black density. In a case where the color density is detected, the light emitted from the infrared-emitting diode (LED) 101 is diffusely reflected from the density pattern printed on the conveyance belt 12 and is received by the phototransistor 103 for reception of the diffuse reflection light, so that the phototransistor 103 generates voltage corresponding to an amount of the light received. In a case where the black density is detected, on the other hand, the light emitted from the infrared-emitting diode (LED) 101 is specularly reflected from the density pattern printed on the conveyance belt 12 and is received by the phototransistor 102 for reception of the specular reflection light, so that the phototransistor 102 generates voltage corresponding to an amount of the light received.

Now, the control circuit of the image forming apparatus 1 according to the first embodiment of the present invention is described with reference to FIG. 1. A host interface unit 50 serves as a physical layer interface with a host computer and includes a connector and a communication chip. A command and image processing unit 51 interprets a command and image data from the host computer or expands the command and the image data to bitmap. The command image processing unit 51 includes a microprocessor (not shown), a random access memory (RAM, not shown), and a specific hardware (not shown) for expansion and controls the image forming apparatus 1 as a whole. A light emitting diode (LED) head interface unit 52 includes a semi-customized large-scale integration (LSI, not shown) and a random access memory (RAM, not shown), and processes the image data expanded to the bitmap by the command and image processing unit 51 in accordance with the interface of each of the LED heads 301, 302, 303, and 304.

The command and image processing unit 51 also includes a gradation correction control unit 80 having a function of a gradation correction. The gradation correction control unit 80 performs the gradation correction based on a correspondence relationship between print density data actually detected and a standard target gradation characteristic data, serving as gradation data to be targeted, stored in a storage mechanism 81 beforehand. A brief description of the gradation correction is now given. For example, in a case where the print density to correspond to a gradation level of 153 among 256 gradation levels is actually printed with a gradation level of 165, a signal of the gradation level 165 is replaced with a signal of the gradation level 153, thereby correcting density deviation between the gradation data and the actual density by such a signal process. In the storage mechanism 81, a standard target gradation characteristic table 87 serving as the gradation data to be targeted is stored beforehand. The storage mechanism 81 includes a function of storing a gradation correction value table 84 serving as a gradation correction result.

A mechanism control unit 53 controls each element of an engine unit of the image forming apparatus 1. The mechanism control unit 53 drives each of motors 54 through 58 and controls a heater 59 and a high pressure control unit 60, thereby controlling a print mechanism of a printing system and a high voltage power source according to an instruction from the command and image processing unit 51 while monitoring an input from a sensor. Each of the motors 54 through 58 includes a motor driving the print mechanism and a roller, for example, a heat roller, and a driver driving such a motor. The heater 59 is the halogen lamp disposed inside the heat roller 25, and the thermistor 28 is disposed above the heat roller 25, thereby controlling the temperature.

Figure 12:
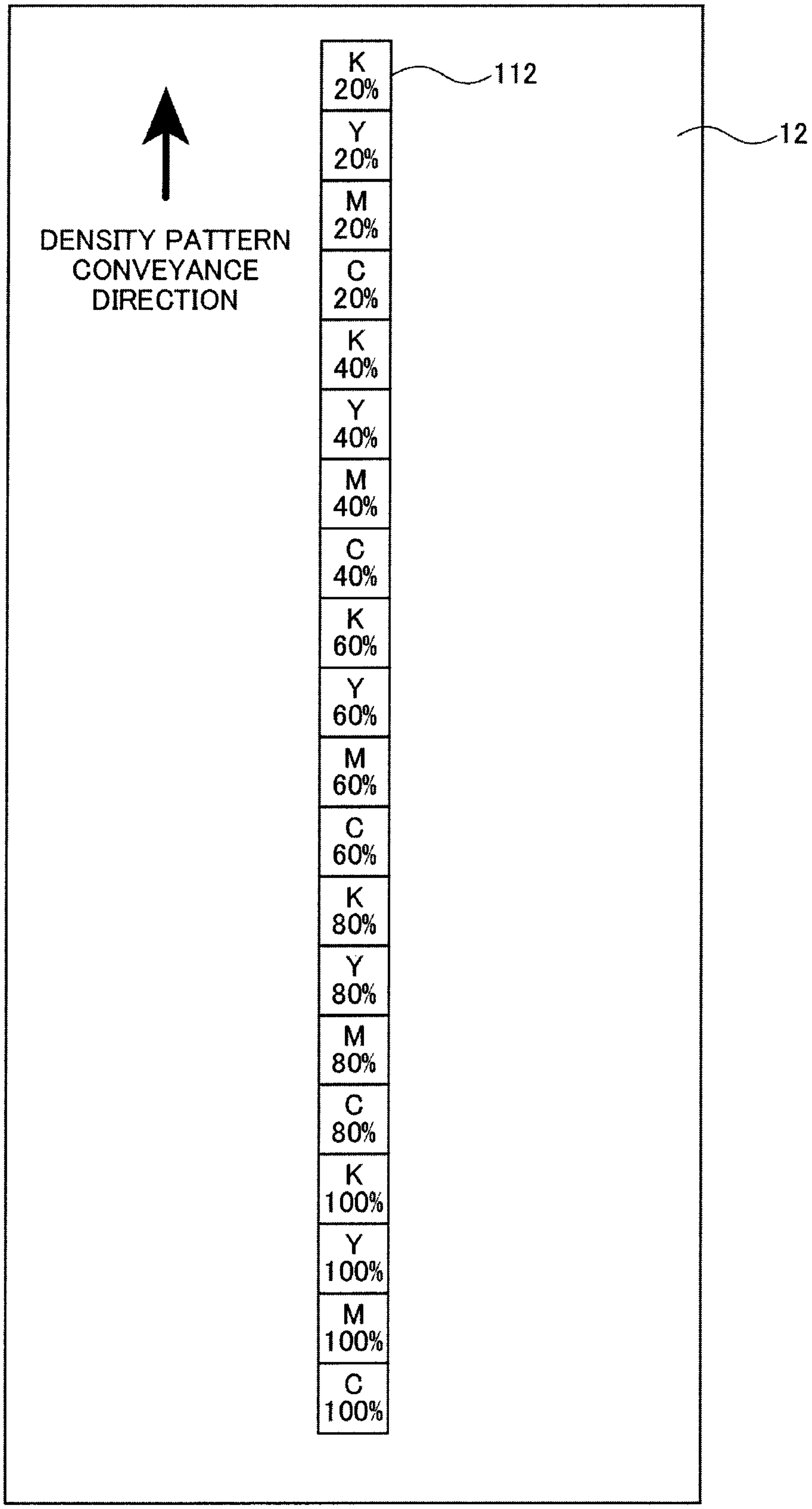
FIG. 12 is a schematic diagram illustrating an example of anther density detection pattern of the image forming apparatus according to the first embodiment of the present invention.

The mechanism control unit 53 is connected to a storage mechanism 90 capable of storing various data. In the storage mechanism 90, a density detection pattern 11 illustrated in FIG. 6 and a density detection pattern 112 illustrated in FIG. 12 are stored beforehand. In the storage mechanism 90, a density sensor output expectation value table 70, a development voltage value adjustment amount table 82, a LED driving time adjustment amount table 83, a development voltage control amount weighting coefficient table 71, a LED driving time control amount weighting coefficient table 72, a target print density data table 85, and a normal density correction execution judgment reference value table 86 illustrated in FIGS. 7, 8, 9, 10, 11, 29, and 30, respectively are also stored beforehand. Such tables 70, 82, 83, 71, 72, 85, and 86 are needed for the density correction process. The storage mechanism 90 also includes a function of storing the print data detected by the density sensor 24.

A density correction execution judging unit 64 of the mechanism control unit 53 judges whether to perform the density correction process based on a density correction process execution judging condition, for example, where the power source is turned on, where a prescribed number of sheets are printed, and where an environmental change is occurred in a position of the image forming apparatus 1. Such a density correction process execution judging condition is arranged beforehand. A density difference calculation unit 66 of the mechanism control unit 53 calculates a density difference based on the print density data detected by the density sensor 24 and the density data from the target print density data table 85 stored in the storage mechanism 90.

Figures 30, 31:
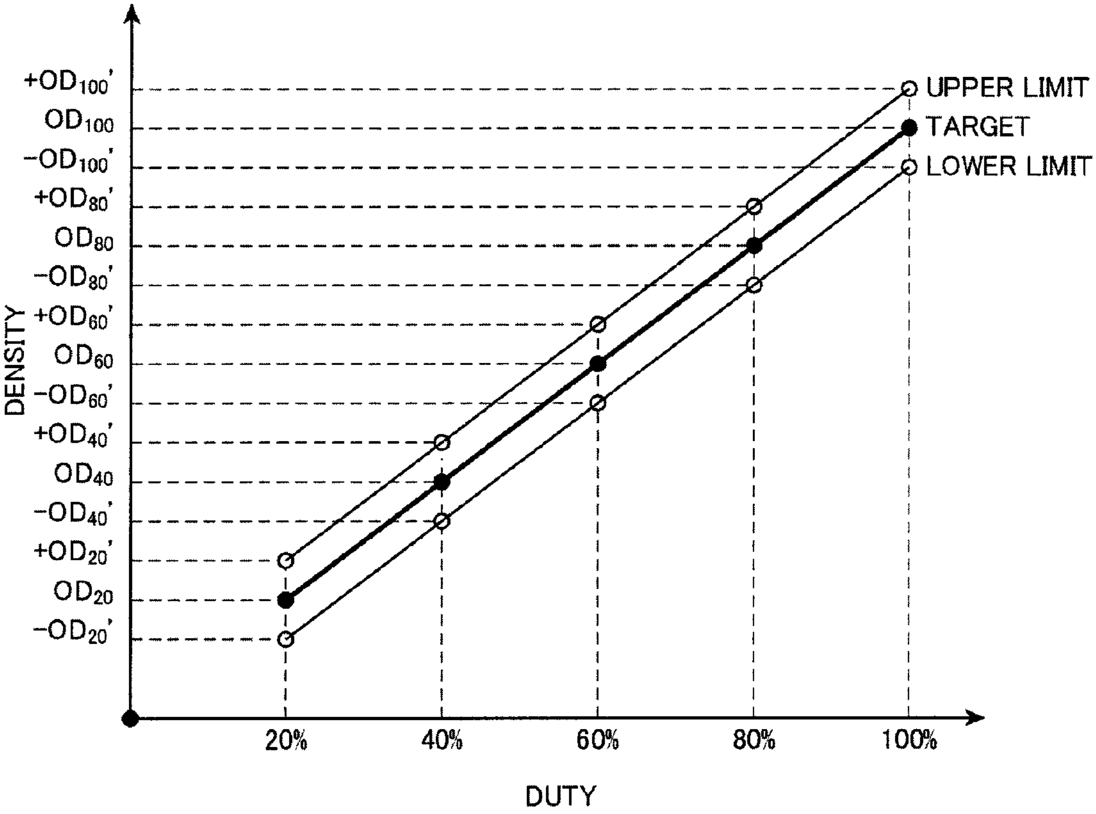
FIG. 30 is a schematic diagram illustrating a table regarding a normal density correction execution judgment reference value of the image forming apparatus according to the first embodiment of the present invention.
FIG. 31 is a schematic diagram explaining normal density correction execution judgment of the image forming apparatus according to first embodiment of the present invention and illustrating a relationship between the density and the DUTY.

A comparison judging unit 65 of the mechanism control unit 53 serves as a normal density correction execution judging unit in the first embodiment, and judges whether to perform a normal density correction process by comparing the density difference calculated by the density difference calculation unit 66 with a normal density correction execution judgment reference value stored in the normal density correction execution judgment reference value table 86 of the storage mechanism 90. The normal density correction execution judgment reference value serves as a reference value to judge whether to perform the normal density correction process. Where the normal density correction execution judgment reference value is large, the normal density correction is executed with a large density difference, thereby increasing a cycle of the normal density correction execution. On the other hand, where the normal density correction execution judgment reference value is small, the normal density correction process is executed with a little density difference, thereby increasing the frequency of the density correction. Such a normal density correction execution judgment reference value may be determined at a time of shipping out the image forming apparatus 1 or may be arranged in such a manner as to be optionally changed by a user according to a usage condition. FIG. 31 illustrates an example case where the density difference is extended to an upper limit and a lower limit with respect to the target density. Where a detection value is between the upper limit and the lower limit, the data is determined to be within the reference value, thereby providing the gradation correction only.

The storage mechanism 90 stores the density data detected by the density sensor 24, and the mechanism control unit 53 reads the density data from the storage mechanism 90 and calculates an amount of the driving time of the LED heads 301, 302, 303, and 304 to be increased or decreased such that the density becomes the target value. The LED head interface unit 52 changes the driving time of the LED heads 301 through 304 based on a result calculated by the mechanism control unit 53. According to the first embodiment, the driving time of the LED heads 301 through 304 is changed to change the density, but is not limited thereto. Alternatively, an electric current value or driving voltage supplied to respective light-emitting diodes of the LED heads 301 through 304 may be adjusted.

The high pressure control unit 60 includes a microprocessor (not shown) or a customized LSI (not shown) and generates charging voltage, development bias, transfer voltage and the like with respect to each of the print mechanisms 201 through 204. A charging voltage generation unit 61 (hereafter referred to as a CH generation unit 61) generates and halts the charging voltage provided to each of the print mechanisms 201 through 204. A development bias generation unit 62 (hereafter referred to as a DB generation unit 62) supplies the development bias to each of the print mechanisms 201 through 204. A transfer voltage generation unit 63 (hereafter referred to as a TR generation unit 63) applies the transfer voltage with respect to the transfer rollers 401, 402, 403, and 404 of respective print mechanisms 201, 202, 203, and 204. The TR generation unit 63 includes a current/voltage detection circuit, thereby controlling the current at a constant level (i.e., constant current) or the voltage at a constant level (i.e., constant voltage).

The storage mechanism 90 stores the density data detected by the density sensor 24, and the mechanism control unit 53 reads the density data from the storage mechanism 90 so as to calculate an amount of the development voltage to be increased or decreased such that the density becomes the target value. According to the calculation result, the high pressure control unit 60 supplies an instruction with respect to the DB generation unit 62 to change the development voltage. In the first embodiment, the development voltage is changed to change the density, but is not limited thereto. Alternatively, supply voltage or the charging voltage may be changed, or the development voltage with the supply voltage and the charging voltage may be controlled.

The operation of the image forming apparatus 1 according to the first embodiment of the present invention is now described. The image forming apparatus 1 of the first embodiment capable of executing two density correction processes by the comparison judging unit 65. Such two density correction processes are the density correction in a normal mode and the density correction in a shortening mode, and the normal mode and the shortening mode can be switched therebetween. For example, inactivation of the comparison judging unit 65 can switch the density correction process to the normal mode, and activation of the comparison judging unit 65 can switch the density correction process to the shortening mode. For example, such a switching selection can be made by the user. In a case where the user prefers high quality printing, the density correction process is set such that the normal mode is performed. On the other hand, in a case where the user prefers high speed printing, the density correction process is set such that the shortening mode is performed. Such switching of the density correction processes between the normal mode and the shortening mode may be automatically selected by the image forming apparatus 1. For example, in a case where density change corresponding to a condition such as temperature, etc. is expected to be small, or immediately after the density correction process in the normal mode is performed, the density correction process in the shortening mode can be performed. In a case of another condition, on the other hand, the operation in the normal mode can be performed.

Figure 4:
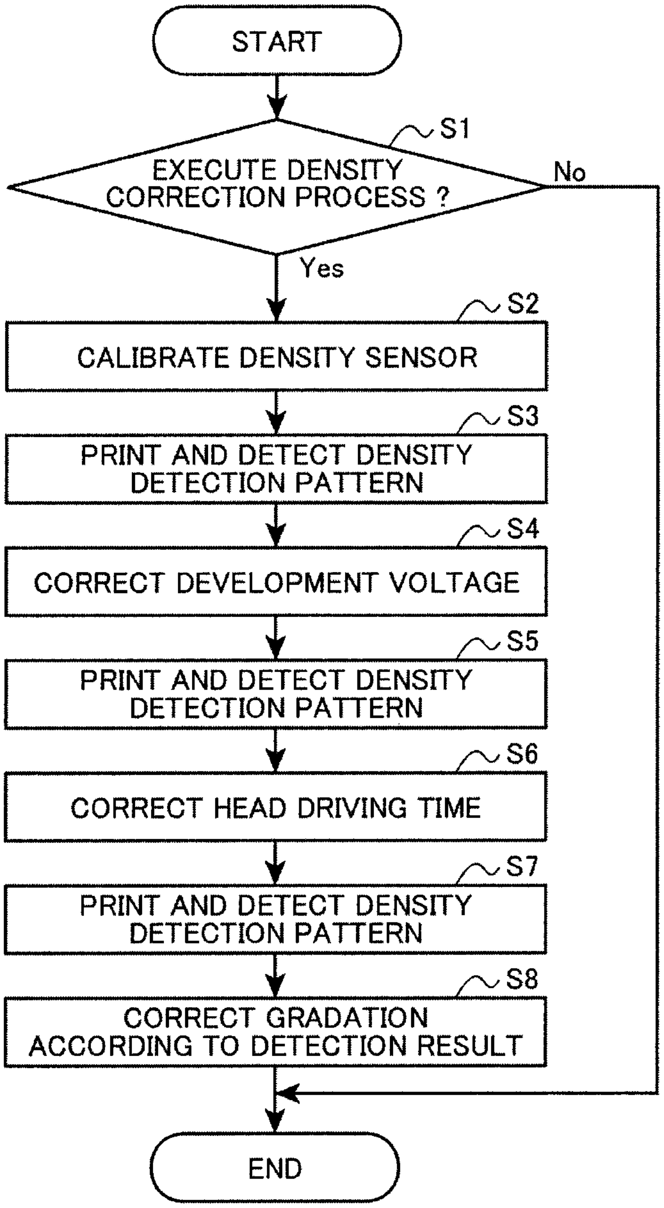
FIG. 4 is a flowchart illustrating an example operating procedure of the image forming apparatus according to the first embodiment of the present invention in a case of a normal mode.

Referring to FIG. 4, an example procedure for operating the density correction in the normal mode is illustrated. An example procedure for operating the density correction in the shortening mode is explained later with reference to FIG. 5.

In step S1 of the density correction process in FIG. 4, the density correction execution judging unit 64 of the mechanism control unit 53 performs a density correction process execution judgment. The density correction process execution judging condition includes a condition to begin the execution of the density correction, for example, where the power source is turned on, where the prescribed number of sheets are printed, and where the environmental change and the like is expected to occur in the position of the image forming apparatus 1. Where the density correction execution judging unit 64 judges to execute the density correction process (Yes in step S1), flow proceeds to step S2. Where the density correction execution judging unit 64 judges not to execute density correction (No in step S1), the density correction process is finished.

In step S2, light-emitting electric current of the infrared-emitting diode 101 is adjusted (hereafter referred to as calibration) to accommodate a variation in a mounting angle, a distance or temperature and the like of the density senor 24. In the calibration, the light-emitting electric current of the infrared-emitting diode 101 is adjusted with respect to an optional reference reflection member such that the output voltage of the phototransistor 102 for reception of the specular reflection light and the phototransistor 103 for reception of the diffuse reflection light is within a setting range.

Figures 6, 7:
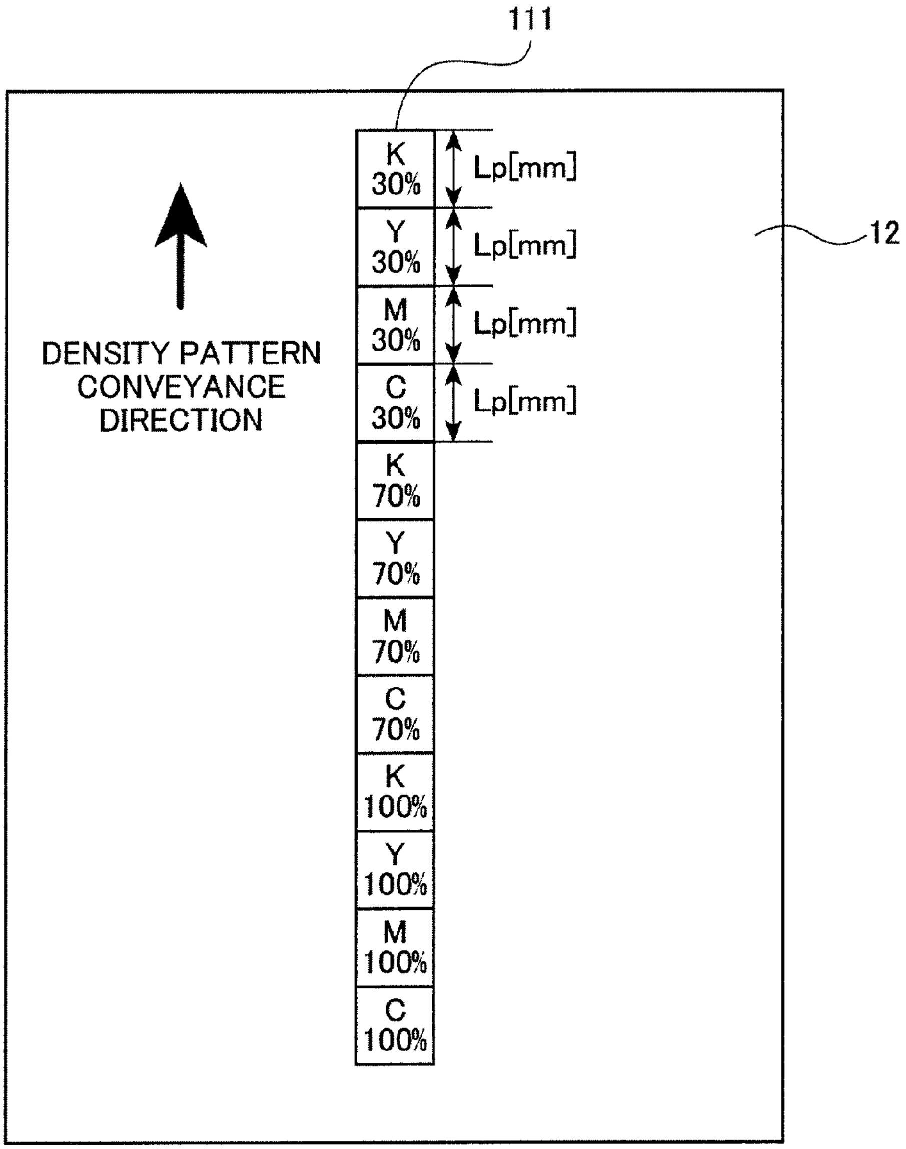
FIG. 6 is a schematic diagram illustrating an example of a density detection pattern of the image forming apparatus according to the first embodiment.
FIG. 7 is a schematic diagram illustrating a table of an expectation value of an output from the density sensor output of the image forming apparatus according to the first embodiment of the present invention.

Upon receiving a signal for execution of the density detection, the mechanism control unit 53 begins to print the density detection pattern 111 illustrated in FIG. 6 stored beforehand in the storage mechanism 90 on the conveyance belt 12 (step S3) after the calibration is finished. The density detection pattern 111 includes three sets of patterns in sequence of black, yellow, magenta, and cyan arranged from the downstream side in the conveyance direction as illustrated in FIG. 6. Such three sets from the downstream side in the conveyance direction correspond to thirty (30) percent, seventy (70) percent, and one hundred (100) percent of toner development area ratios, respectively. The toner development area ratio indicates a ratio of the toner developed on the conveyance belt 12 in a prescribed area and is hereafter referred to as "DUTY." The density detection pattern 111 has a pattern length of Lp (mm), and the patterns are printed without space between a tailing end of each patterns and a following density detection pattern as illustrated in FIG. 6. According to the first embodiment, the density detection pattern 111 illustrated in FIG. 6 is used for the density detection, but is not limited thereto. Alternatively, the sequence of colors or combination of the "DUTY" may be changed as necessary. Herein, the development voltage value and the LED driving time may have initial values of DBO (V) and DKO (s), respectively which are determined beforehand.

Figure 13:
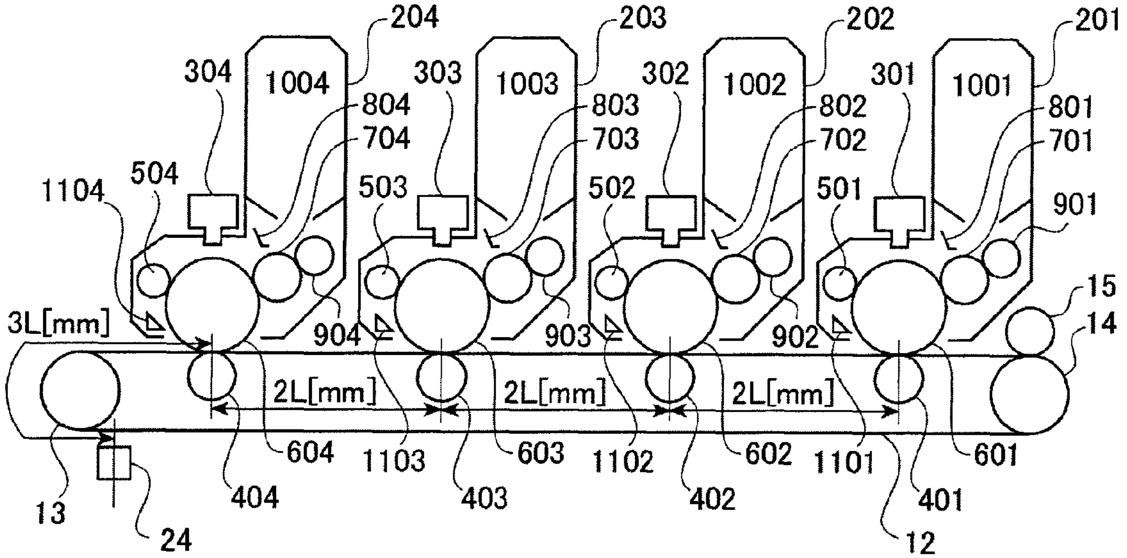
FIG. 13 is a schematic diagram illustrating essential elements of the image forming apparatus according to the first embodiment of the present invention.

As illustrated in FIG. 13, a distance of contact points between the photosensitive drums 601 through 604 and respective the transfer rollers 401 through 404 of respective print mechanisms 201 through 204 is arranged to be 2 L (mm), and a distance from the contact point of the photosensitive drum 604 and the transfer roller 404 of the print mechanism 207 in the most downstream in the conveyance direction to the density sensor 24 is arranged to be 3 L (mm). The conveyance belt 12 is driven and moved by 9 L (mm) from a print beginning position of the black pattern having the ratio of thirty (30) percent, so that the density detection pattern 111 reaches a detection position of the density sensor 24. Moreover, the conveyance belt 12 is driven and moved by Lp/2 (mm), so that a middle portion of the black pattern having the ratio of thirty (30) percent and the detection position of the density sensor 24 are aligned.

The mechanism control unit 53 allows the infrared-emitting diode 101 of the density sensor 24 to emit the infrared light with prescribed energy, so that the density detection pattern 111 is irradiated with the infrared light. Such infrared light is reflected from the density detection pattern 111 or the conveyance belt 12, and reflection intensity is received by the phototransistor 102 for reception of the specular reflection light and the phototransistor 103 for reception of the diffuse reflection light. Each of the phototransistors 102 and 103 is driven by a circuit (not shown) and applies the electric current proportional to light receiving energy. Such electric current is converted into the voltage by the circuit (not shown) and is read by the mechanism control unit 53. In a case where the pattern read by the mechanism control unit 53 is yellow, magenta, and cyan, the mechanism control unit 53 reads the output voltage of the phototransistor 103 for reception of the diffuse reflection light. In a case of the black pattern, the mechanism control unit 53 reads the output voltage of the phototransistor 102 for reception of the specular reflection light. Since the detection pattern to be read at the beginning is the black pattern having the ratio of thirty (30) percent according to the first embodiment, the output voltage of the phototransistor 102 for reception of the specular reflection light is read. Next, the conveyance belt 12 is driven and moved by a length Lp (mm) of the density detection pattern, so that a middle portion of the yellow pattern having the ratio of thirty (30) percent and the detection position of the density sensor 24 are aligned, thereby reading the output voltage of phototransistor 103 for reception of the diffuse reflection light. Similarly, the output voltage corresponding to each of the patterns in the density detection pattern 111 is sequentially read.

In step S4 of the density correction process in FIG. 4, the mechanism control unit 53 compares the output voltage read thereby with the density sensor output expectation value table 70 stored in the storage mechanism 90, and calculates a difference between a value in the output expectation value table 70 and the density sensor output voltage value. The density sensor output expectation value table 70 is illustrated in FIG. 7. Herein, the expectation value indicates voltage to be output from the sensor where the density of the density detection pattern read is substantially equal to the density to be targeted. A combination of color of the detection pattern and the "DUTY" is stored in the storage mechanism 90.

Moreover, the mechanism control unit mechanism control unit 53 calculates an amount of the development voltage to be increased or decreased for each color based on the difference calculated thereby. For such calculation, the development voltage value adjustment amount table 82 stored in the storage mechanism 90 is used. The development voltage value adjustment amount table 82 is illustrated in FIG. 8. A table value in the development voltage value adjustment amount table 82 indicates an amount of the development voltage to be changed where the difference between the value in the expectation value table 70 and the density sensor output voltage value is V1 (V). According to the first embodiment, the difference V1 (V) is equal to 0.1 (V), but is not limited thereto. The difference V1 (V) may be changed as necessary. The table value in the development voltage value adjustment amount table 82 may be calculated by, for example, a simulation, or may be experimentally determined based on a relationship with the density sensor output voltage value in a case where the development voltage is actually changed.

Figure 14:
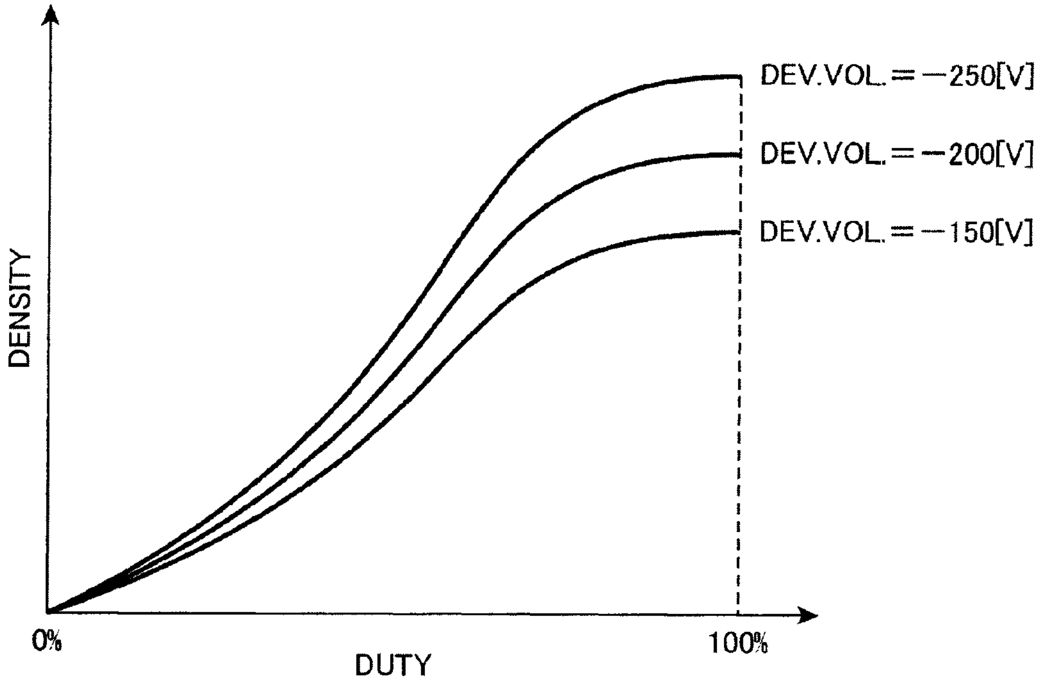
FIG. 14 is a graph illustrating a relationship between print "DUTY" and a density characteristic in a case of changing development voltage of the image forming apparatus according to the first embodiment of the present invention.

Referring to FIG. 14, a relationship between the print "DUTY" and the density in a case where the development voltage is changed is illustrated. In a case where the development voltage is changed, thickness of toner layer to be developed is changed. A degree of the change is relatively high in a high "DUTY" portion, thereby stabilizing solid density.

The mechanism control unit 53 calculates a development voltage value control amount by comparative calculation based on the actual voltage difference. According to the first embodiment, although the development voltage value control amounts with respect to three values of "DUTY" are calculated for each color, only one development voltage value control amount is determined for each color. Therefore, an average of three weighting values is calculated as a development voltage value control amount DB (A). The development voltage control amount weighting coefficient table 71 illustrated in FIG. 10 is used for such a calculation. According to the first embodiment, a table value in the development voltage control amount weighting coefficient table 71 is a suitable value experimentally calculated.

Figures 15, 16:
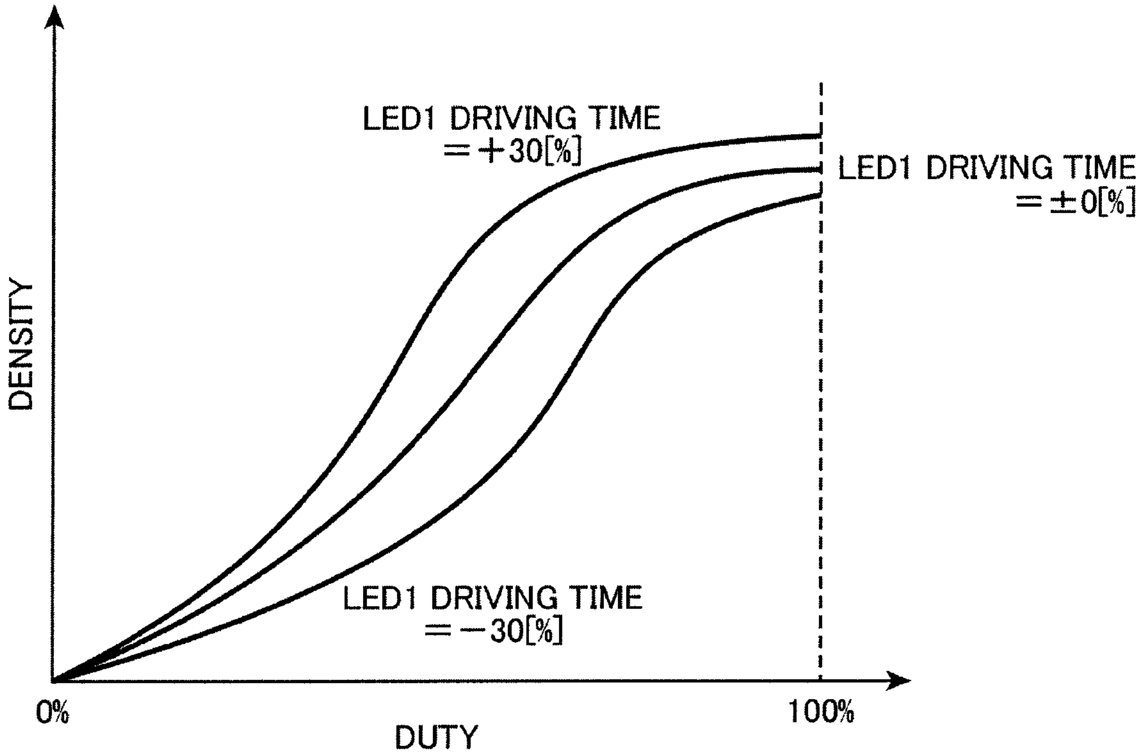
FIG. 15 is a graph illustrating a relationship between the print "DUTY" and the density characteristic in a case of changing an LED driving time of the image forming apparatus according to the first embodiment of the present invention.
FIG. 16 is a schematic diagram illustrating a table regarding an output voltage value of the density sensor of the image forming apparatus according to the first embodiment of the present invention.

The density correction process in step S4 is described in detail with reference to FIGS. 16, 17, 18, and 21. A calculation process of the development voltage value control amount for the color of cyan is described herein. Since each of the calculation processes of the development voltage value control amounts for the colors of black, yellow, and magenta is substantially similar to that of the color of cyan, the description thereof is omitted for the sake of simplicity. FIG. 16 illustrates the output voltage for the cyan patterns having the ratio of thirty (30) percent, seventy (70) percent, and one hundred (100) percent in the density detection pattern 111 read by the density correction process in step S3. FIG. 17 illustrates the table value for the cyan of the density sensor output expectation value table 70. Now, the differences between the table value in the expectation value table 70 and the density sensor output voltage value are determined with respect to the three values of "DUTY" based on formulas 1, 2, and 3 below.

$$(\text{Difference } \Delta CD_{30} \text{ of "DUTY" } 30\%)=CD_{30}-CD_{30}' \qquad \text{Formula 1}$$

$$(\text{Difference } \Delta CD_{70} \text{ of "DUTY" } 70\%)=CD_{70}-CD_{70}' \qquad \text{Formula 2}$$

$$(\text{Difference } \Delta CD_{100} \text{ of "DUTY" } 100\%)=CD_{100}-CD_{100}' \qquad \text{Formula 3}$$

According to the above formulas, the difference of each "DUTY" is determined as follows:

$$\Delta CD_{30}=0.1\ (V)$$

$$\Delta CD_{70}=0.1\ (V)$$

$$\Delta CD_{100}=0.2\ (V)$$

According to the density differences calculated above, the development voltage control amount is determined based on formulas 4, 5, and 6 below. Herein, the table value for cyan of the development voltage value adjustment amount table 82 is illustrated in FIG. 18.

$$(\text{Development voltage control amount } CDB(A)_{30} \text{ of "DUTY" } 30\%)=\Delta CD_{30}/(V1\times\Delta CDB(A)_{30}) \qquad \text{Formula 4}$$

$$(\text{Development voltage control amount } CDB(A)_{70} \text{ of "DUTY" } 70\%)=\Delta CD_{70}/(V1\times\Delta CDB(A)_{70}) \qquad \text{Formula 5}$$

$$(\text{Development voltage control amount } CDB(A)_{100} \text{ of "DUTY" } 100\%)=\Delta CD_{100}/(V1\times\Delta CDB(A)_{100}) \qquad \text{Formula 6}$$

According to the above formulas 4, 5, and 6, the development voltage control amount of each "DUTY" is determined as follows:

$$CDB(A)_{30}=-50\ (V)$$

$$CDB(A)_{70}=-40\ (V)$$

$$CDB(A)_{100}=-40\ (V)$$

According to the first embodiment, the development voltage control amount CDB (A) is set to be the average of the three weighting values of the development voltage control amounts, and is determined based on a formula 7 below with the table value for the cyan of the development voltage control amount weighting coefficient table 71 illustrated in FIG. 21.

$$(\text{Development voltage control amount } CDB(A))=(CDB(A)_{30}\times CODB_{30}+CDB(A)_{70}\times CODB_{70}+CDB(A)_{100}\times CODB_{100})/(CODB_{30}+CODB_{70}+CODB_{100}) \qquad \text{Formula 7}$$

According to the formula 7, the value of CDB(A) is determined as follows:

$$CDB(A)\approx-42\ (V)$$

As described above, the mechanism control unit 53 supplies the instruction to the high pressure control unit 60 to increase or decrease the development voltage based on the development voltage correction result DB (A) of each color determined by the density correction process in step S4.

The DB generation unit 62 supplies a development voltage value DB1 (V) to each of the print mechanisms 201, 202, 203, and 204. Herein, the development voltage value DB1 (V) represents a value of adding the development voltage correction result DB (A) to the development voltage initial value DBO in the course of printing operation.

$$\text{Development voltage value DB1 (V) after correction}=DBO+DB(A) \qquad \text{Formula 8}$$

In step S5 of the density correction process, the mechanism control unit 53 begins to print the density detection pattern 111 on the conveyance belt 12 upon receiving the signal for execution of the density detection as similar to step S3. The mechanism control unit 53 detects the density detection pattern 111 by the density sensor 24 and reads the output voltage of each color of the patterns. Subsequently, in step S6, the mechanism control unit 53 compares the output voltage read with the density sensor output expectation value table 70 stored in the storage mechanism 90 and calculates the difference between the expectation table value and the density sensor output voltage value.

Moreover, the mechanism control unit 53 calculates an amount of the LED driving time of each LED heads 301, 302, 303, and 304 to be increased or decreased based on the density difference. The LED driving time adjustment amount table 83 stored in the storage mechanism 90 is used for such a calculation. FIG. 9 illustrates the LED driving time adjustment amount table 83. Where the difference between the expectation value table value and the density sensor output voltage value is V2(V), the LED driving time adjustment amount table 83 indicates an amount of the LED driving time to be changed. According to the first embodiment, the value of V2(V) is set to be 0.05(V), but is not limited thereto. The value of V2(V) may be changed as necessary. The table value in the LED driving time adjustment amount table 83 may be calculated by, for example, a simulation, or may be experimentally determined based on a relationship with the density sensor output voltage value in a case where the LED driving time is actually changed.

Referring to FIG. 15, a relationship between the print "DUTY" and the density in a case where the LED driving time is changed is illustrated. As illustrated in FIG. 15, in a case where the LED driving time is changed, a change of the density in a middle "DUTY" portion is greater than that of the density in a low "DUTY" portion or the high "DUTY" portion. Therefore, the density of a middle tone can be stabilized.

The mechanism control unit 53 calculates the LED driving time control amount by proportional calculation based on the voltage difference detected. According to the first embodiment, although the development voltage value control amounts with respect to three values of "DUTY" are calculated for each color, only one development voltage value control amount is determined for each color. Therefore, an average of three weighting values is calculated as an LED driving time control amount DK (A). The LED driving time control amount weighting coefficient table 72 illustrated in FIG. 11 is used for such a calculation. Herein, a table value in the LED driving time control amount weighting coefficient table 72 is a suitable value experimentally calculated.

The density correction process in step S6 is described in detail with reference to FIGS. 19, 20 and 22. A calculation process of the LED driving time control amount for the color of cyan is described herein. Since each of the calculation processes of the LED driving time control amounts for the colors of black, yellow, and magenta is substantially similar to that of the color of cyan, the description thereof is omitted for the sake of simplicity. FIG. 19 illustrates the output voltage for the cyan patterns having the ratio of thirty (30) percent, seventy (70) percent, and one hundred (100) percent in the density detection pattern 111 read by the density correction process in step S5. Now, the differences between the table value in the density sensor output expectation value table 70 and the density sensor output voltage value are determined with respect to the three values of "DUTY" based on formulas 9, 10, and 11 below.

$$(\text{Difference } \Delta CD_{30}' \text{ of "DUTY" } 30\%) = CD_{30} - CD_{30}'' \qquad \text{Formula 9}$$

$$(\text{Difference } \Delta CD_{70}' \text{ of "DUTY" } 70\%) = CD_{70} - CD_{70}'' \qquad \text{Formula 10}$$

$$(\text{Difference } \Delta CD_{100}' \text{ of "DUTY" } 100\%) = CD_{100} - CD_{100}'' \qquad \text{Formula 11}$$

According to the above formulas, the difference of each "DUTY" is determined as follows:

$$\Delta CD_{30}' = 0.02\ (V)$$

$$\Delta CD_{70}' = -0.01\ (V)$$

$$\Delta CD_{100}' = -0.01\ (V)$$

According to the differences calculated above, the LED driving time control amount is determined based on formulas 12, 13, and 14 below. Herein, the table value for the cyan of the LED driving time adjustment amount table 83 is illustrated in FIG. 21.

$$(\text{LED driving time control amount } CDK(A)_{30} \text{ of "DUTY" } 30\%) = \Delta CD_{30}'/V1 \times \Delta CDK(A)_{30} \qquad \text{Formula 12}$$

$$(\text{LED driving time control amount } CDK(A)_{70} \text{ of "DUTY" } 70\%) = \Delta CD_{70}'/V1 \times \Delta CDK(A)_{70} \qquad \text{Formula 13}$$

$$(\text{LED driving time control amount } CDK(A)_{100} \text{ of "DUTY" } 100\%) = \Delta CD_{100}'/V1 \times \Delta CDK(A)_{100} \qquad \text{Formula 14}$$

According to the formulas 12, 13, and 14, the LED driving time control amount for each "DUTY" is follows.

$$CDK(A)_{30} = 13(\%)$$

$$CDK(A)_{70} = -2(\%)$$

$$CDK(A)_{100} = -8(\%)$$

The LED driving time control amount CDK(A) is set to be the average of the three weighting values of the LED driving time control amounts, and is determined based on a formula 15 below with an LED driving time control amount weighting coefficient table value illustrated in FIG. 22.

$$(\text{LED driving time control amount } CDK(A)) = (CDK(A)_{30} \times CODK_{30} + CDK(A)_{70} \times CODK_{70} + CDK(A)_{100} \times CODK_{100}) / (CODK_{30} + CODK_{70} + CODK_{100}) \qquad \text{Formula 15}$$

According to the formula 15, the value of CDK(A) is determined as follows:

$$CDK(A) \approx 2(\%)$$

Therefore, the mechanism control unit 53 supplies the instruction to the LED head interface unit 52 to increase or decrease the driving time of each of the LED heads 301, 302, 303, and 304 according to a LED driving time correction result DK (A) of each color determined in step S6. The LED head interface unit 52 allows each of the LED heads 301, 302, 303, and 304 to emit the light at the LED driving time at which the LED driving time correction result DK (A) is added to an LED driving time initial value in the course of printing operation.

$$\text{LED driving time } DK1(s) \text{ after correction} = DK0 + DK0 \times DK(A) \qquad \text{Formula 16}$$

In step S7 of the density correction process, the mechanism control unit 53 begins to print the density detection pattern 112 illustrated in FIG. 12 stored beforehand in the storage mechanism 90 on the conveyance belt 12 upon receiving the signal for execution of the density detection. The density detection pattern 112 includes three sets of patterns in sequence of black, yellow, magenta, and cyan arranged from the downstream side in the conveyance direction as illustrated in FIG. 12. Such three sets from the downstream side in the conveyance direction correspond to twenty (20) percent, forty (40) percent, sixty (60) percent, eighty (80) percent, and one hundred (100) percent of the "DUTY," respectively. Since not only the density value between each "DUTY" is approximately determined based on the print density data (described later), but also such a density value is more accurately determined with a greater number of samples, combinations of the "DUTY" are set to be twenty (20) percent, forty (40) percent, sixty (60) percent, eighty (80) percent, and one hundred (100) percent in the first embodiment. According to the first embodiment, the density detection pattern 112 illustrated in FIG. 12 is used for the density detection, but is not limited thereto. Alternatively, the sequence of colors or the combination of the "DUTY" may be changed as necessary. As similar to the detection correction process in step S3, the mechanism control unit 53 detects the density detection pattern 112 printed on the conveyance belt 12 by the density sensor 24 and reads the output voltage of each color pattern.

Now, the density correction process in step S8 regarding the gradation correction is described in detail with reference to FIGS. 25, 26, 27, and 28. The gradation correction control unit 80 disposed in a portion of the command and image processing unit 51 receives the print density data read by the mechanism control unit 53. According to the first embodiment, five variations of the patterns having the twenty (20) percent, forty (40) percent, sixty (60) percent, eighty (80) percent, and one hundred (100) percent of the "DUTY" for each color of the black, yellow, magenta, and cyan are used as the density detection pattern 112. Herein, in a case where each "DUTY" is expressed with the 256 gradation levels from zero to 255, the twenty (20) percent, forty (40) percent, sixty (60) percent, eighty (80) percent, and one hundred (100) percent are expressed as gradation levels 51, 102, 153, 204, and 255, respectively. The gradation correction control unit 80 approximately calculates the density values for the 256 gradation levels based on the print density data received.

The storage mechanism 81 stores the standard target gradation characteristic table 87 storing the density value for each gradation level in a table format therein. FIG. 26 illustrates the standard target gradation characteristic table 87, and a table value in the standard target gradation characteristic table 87 is experimentally determined or is determined by a simulation such that ideal continuous gradation is reproduced.

Figure 27:
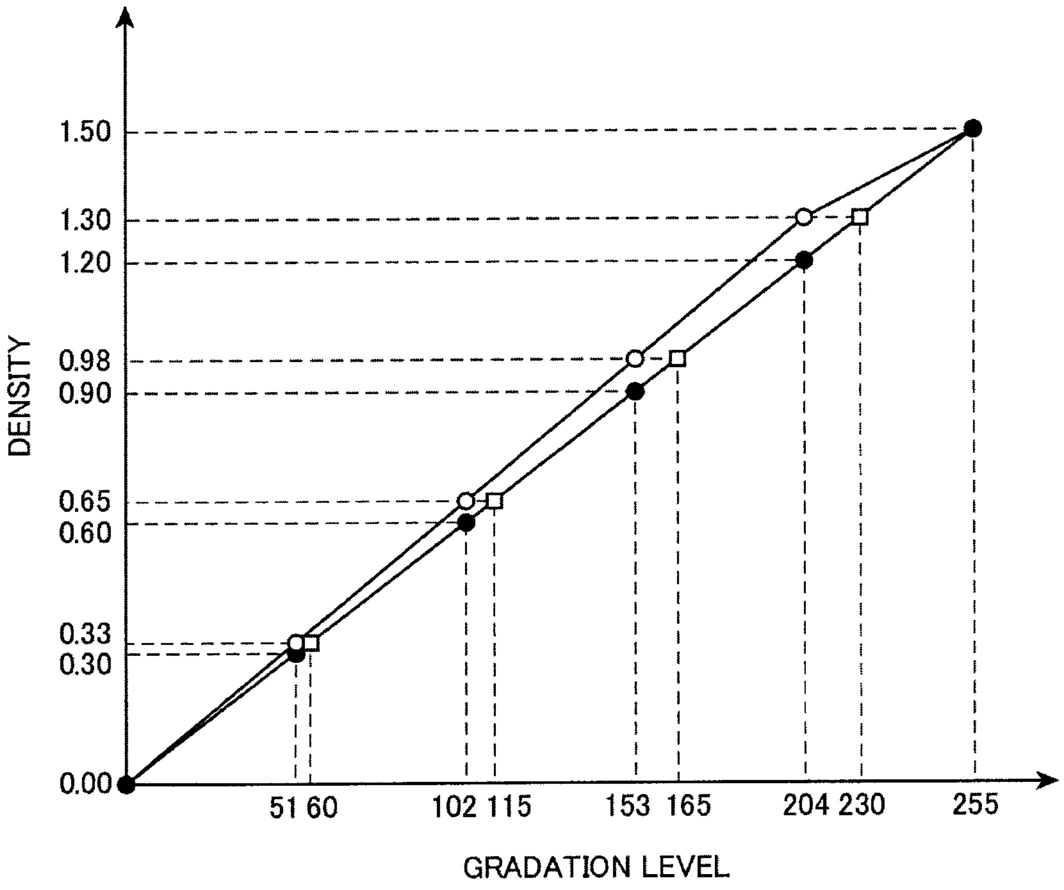
FIG. 27 is a schematic diagram explaining a gradation correction in the image forming apparatus according to the first embodiment of the present invention and illustrating a relationship between the density and the gradation level.

Subsequently, the gradation control unit 80 compares a print density characteristic and a standard target gradation characteristic. Where the print density characteristic and the standard target gradation characteristic are matched, the ideal continuous gradation can be reproduced. However, a deviation may actually be generated between the print density characteristic and the standard target gradation characteristic as illustrated in FIG. 27. A line with white circles represents the print density characteristic (detection value), and a line with black circles represents the standard target gradation characteristic in FIG. 27. For example, the gradation level 51 has the density value of 0.33 with respect to the print density characteristic and the density value of 0.30 with respect to the standard target gradation characteristic. The density value of 0.33 with respect to the print density characteristic corresponds to the standard target gradation characteristic of the gradation level 60. Herein, the gradation correction control unit 80 updates an output gradation level of an input gradation level 51 in the gradation correction value table 84 stored in the storage mechanism 81 to be 60. The gradation correction value table 84 illustrated in FIG. 28 is a table used to convert the input gradation level into the output gradation level. The gradation level 102 has the density value of 0.65 with respect to the print density characteristic and the density value of 0.60 with respect to the standard target gradation characteristic. Since the density value of 0.65 with respect to the print density characteristic corresponds to the standard target gradation characteristic of the gradation level 115, the output gradation level of the input gradation level 102 in the gradation correction value table 84 to be stored as 115. Similarly, the input gradation level and the output gradation level are matched with respect to each of the 256 gradation levels, and a correspondence relationship between the updated input and output gradation levels is stored in the gradation correction value table 84. Such a gradation correction value table 84 allows the input gradation level needed to be recognized in a case where a certain value of the output gradation level serves as the image data. Consequently, in case where the image process is executed with the signal of the input gradation level recognized, the output gradation level corresponding to such an input gradation level is obtained in a printing result.

In the density correction process in the normal mode, the physical characteristic (development voltage, LED driving time, etc.) of the engine unit of the image forming apparatus 1 is adjusted, and the gradation correction is performed by the gradation correction control unit 80 of the command and image processing unit 51 by a series of processes described above, thereby stabilizing the print density to be output.

Now, the shortening mode according to the density correction process of the first embodiment is described. Where the density difference detected and calculated does not exceed the reference value, the physical characteristic of the engine unit of the image forming apparatus 1 is not adjusted. The shortening mode is selected from the normal and shortening modes by selection of high-speed printing by the user, for example.

Figure 5:
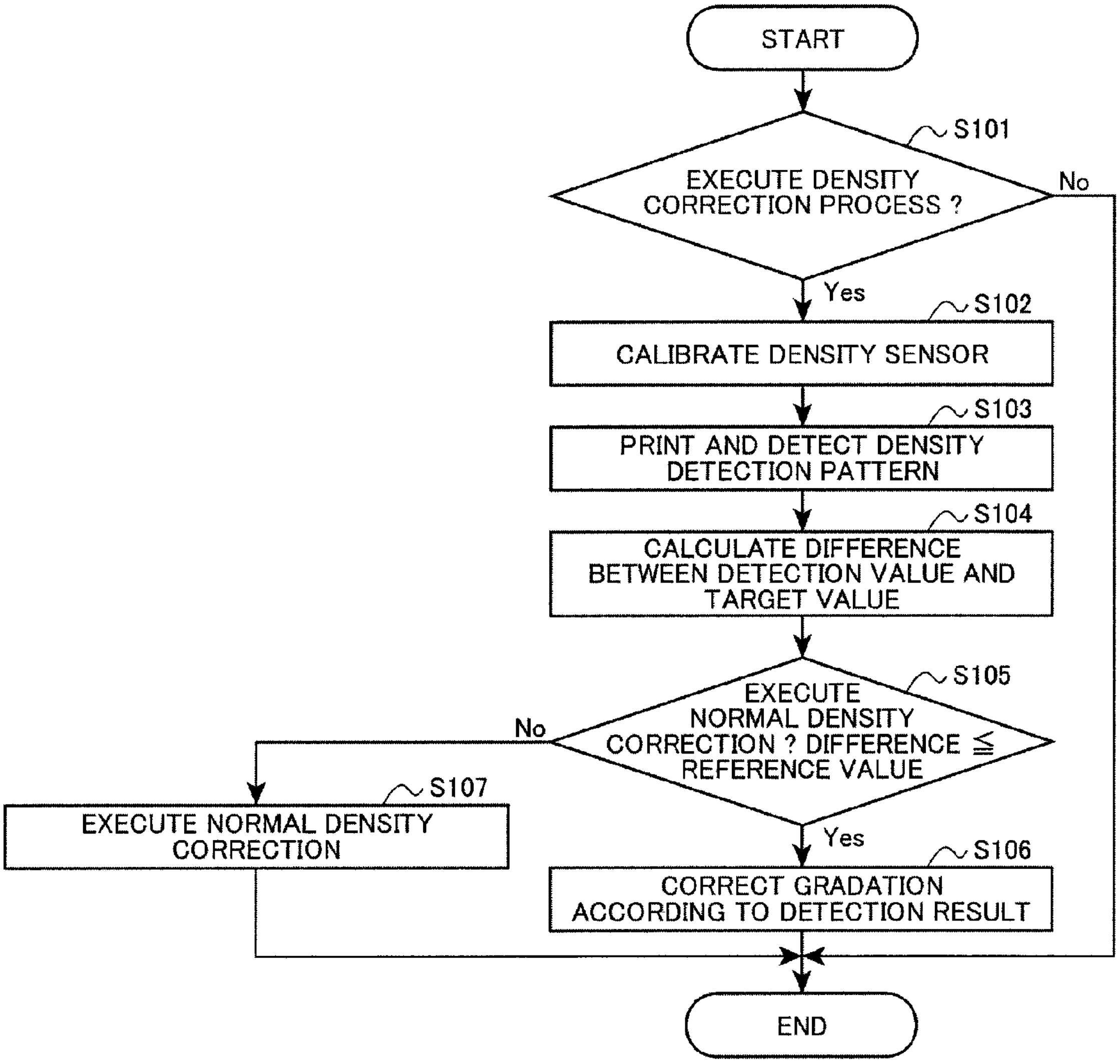
FIG. 5 is a flowchart illustrating an example operating procedure of the image forming apparatus according to the first embodiment of the present invention in a case of a shortening mode.

Referring to FIG. 5, an example procedure for operating the density correction in the shortening mode according to the first embodiment is illustrated.

In step 101, the density correction execution judging unit 64 of the mechanism control unit 53 performs the density correction process execution judgment. Similar to step S1 in FIG. 4, the density correction process execution judgment is proceeded, for example, where the power source is turned on, where the prescribed number of sheets are printed, and where the environmental change and the like is occurred. Where the density correction execution judging unit 64 judges to execute the density correction process (Yes in step S101), flow proceeds to step S102. Where the density correction execution judging unit 64 judges not to execute the density correction process (No in step S101), the density correction process is finished.

In step S102, the density sensor 24 is calibrated. In the calibration, the light-emitting electric current of the infrared-emitting diode 101 is adjusted to accommodate the variation in the mounting angle, the distance or the temperature and the like of the density senor 24 as described above with the description of the normal mode.

In step S103, the mechanism control unit 53 begins to print the density detection pattern 112 illustrated in FIG. 12 stored beforehand in the storage mechanism 90 upon receiving the signal for execution of the density detection. The density detection pattern 112 includes the three sets of patterns in sequence of black, yellow, magenta, and cyan arranged from the downstream side in the conveyance direction as illustrated in FIG. 12. Such three sets from the downstream side in the conveyance direction correspond to twenty (20) percent, forty (40) percent, sixty (60) percent, eighty (80) percent, and one hundred (100) percent of the "DUTY," respectively. As similar to step S3 in FIG. 4, the mechanism control unit 53 detects the density detection pattern 112 printed on the conveyance belt 12 by the density sensor 24 and reads the output voltage of each color pattern.

Subsequently, in step S104, the density difference calculation unit 66 of the mechanism control unit 53 calculates the density difference based on the print density data read in step S103 and the target print density data table 85 stored in the storage mechanism 90 beforehand. Similar to the table value in the standard target gradation characteristic table 87, the table value in the target print density data table 85 is experimentally determined such that the ideal continuous gradation is reproduced.

In step S105 of the density correction process, the comparison judging unit 65 of the mechanism control unit 53 performs a normal time density correction process execution judgment. Herein, the normal time density correction process execution judgment indicates the density correction process described with reference to FIG. 4 and a content of the density correction process in the normal mode. The execution judgment condition of the normal time density correction process execution judgment allows the comparison of the density difference with the normal density correction execution judgment reference value table 86 stored beforehand in the storage mechanism 90. Where the difference is smaller than or equal to the reference value (Yes in step S105), flow proceeds to step S106 in which the density correction process is simplified. Where the difference is greater than the reference value for any one of the colors (No in step S105), flow proceeds to step S107. That is, where the density difference exceeds the reference value (No in step S105), flow proceeds to the density correction process as similar to the normal mode. On the other hand, where the density difference does not exceed the reference value (Yes in step S105), the gradation correction process is performed in a case of the shortening mode, thereby shortening the process time.

The density correction process at the normal time in Step S107 is substantially similar to step S3 through step S8 of the density correction process described above with reference to FIG. 4. According to the table value of the reference value table 86 of the first embodiment, an influence caused by the deviation of the actual print density from the target print density on the gradation characteristic of a post-gradation correction is experimentally determined, and a variation in the print density is served as the reference value where the gradation characteristic obtained is within a specification range.

Where the density difference does not exceed the reference value (Yes in S105), flow proceeds to step S106. Since step S106 is substantially similar to step S8 described with reference to FIG. 4, the description thereof is omitted. The input gradation level and the output gradation level are corresponded with respect to each gradation level, and the correspondence relationship between the updated input and output gradation levels is stored in the gradation correction value table 84. Consequently, in a case where the printing process is executed with such a data table, the corresponded output gradation level is obtained in the printing result.

According to the first embodiment, the switching between the normal mode and the shortening mode in the density correction process is preferably optionally selected by the user. For example, in a case where the user needs the high quality printing, the normal mode is set. In a case where the user needs the high-speed printing, the shortening mode is set. Therefore, the usability can be enhanced.

In the shortening mode of the density correction process according to the first embodiment, the gradation correction is performed without execution of the normal density correction. Therefore, printing quality can be maintained at a desired level of the user by execution of the gradation correction where the density difference between the target density of the printing density and the actual printing density is within the prescribed range, that is, within the normal density correction execution process judgment reference value.

Figure 23:
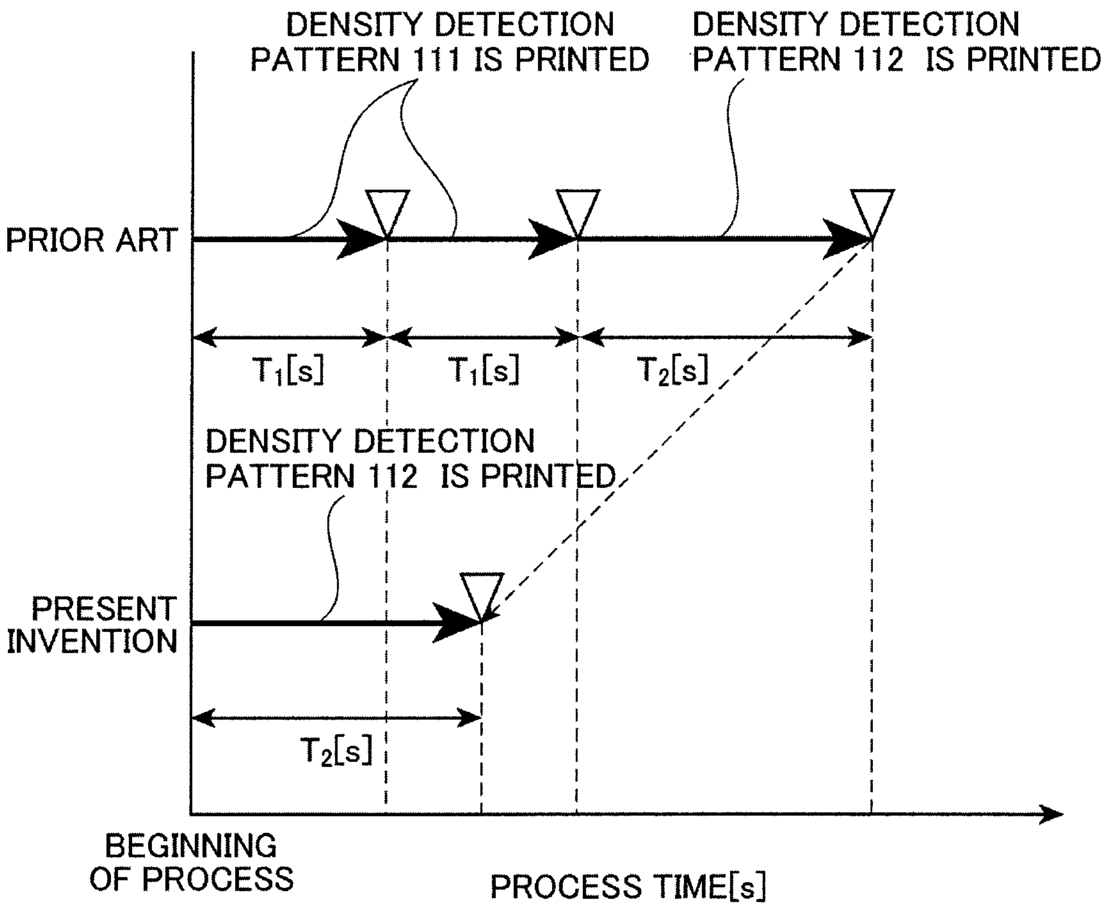
FIG. 23 is a time chart illustrating a comparison of process time between the image forming apparatus according to the first embodiment of the present invention and a prior art image forming apparatus.
Figure 24:
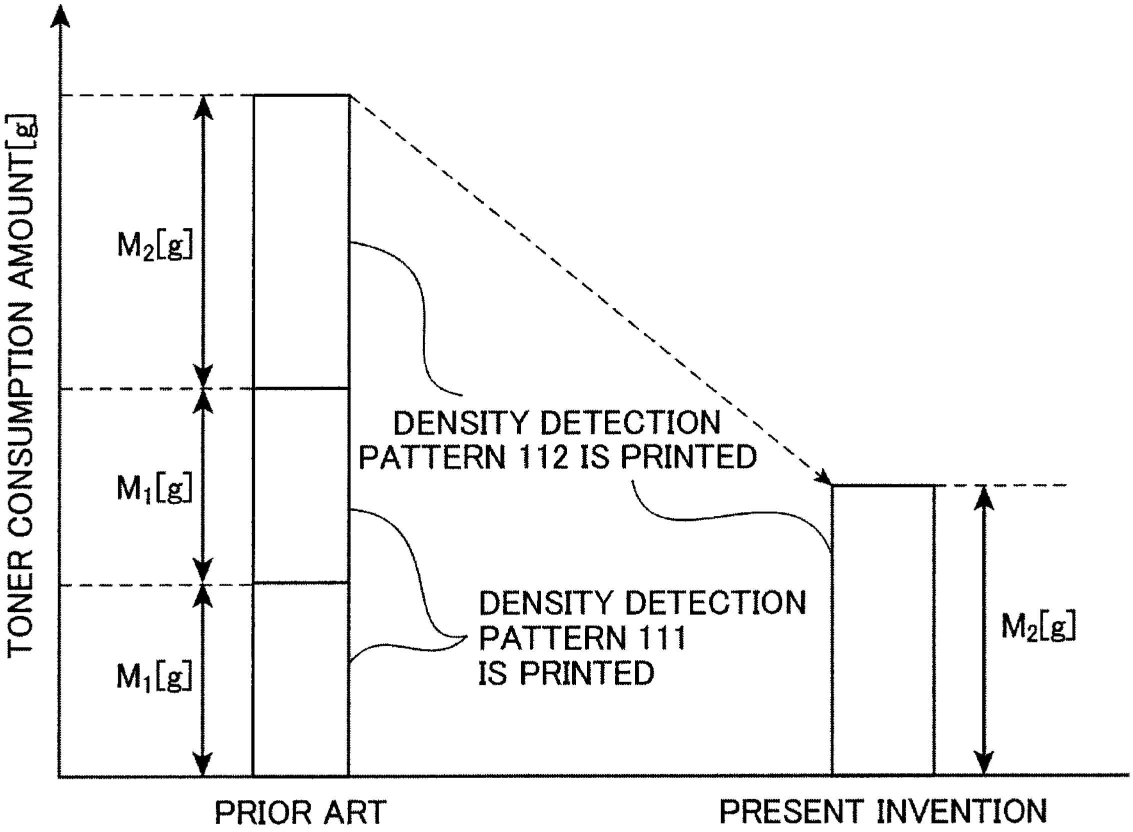
FIG. 24 is a schematic diagram illustrating a comparison of a toner consumption amount between the image forming apparatus according to the first embodiment of the present invention and the prior art image forming apparatus.

According to the first embodiment, a number of printing and detection processes of the density detection patterns can be reduced, thereby shortening the density correction process time in comparison with a prior art density correction process. The comparison of the first embodiment with the prior art density correction process is illustrated in FIGS. 23 and 24. FIG. 23 illustrates the comparison where the density difference does not exceed the reference value. An upper portion of FIG. 23 represents operation of the prior art density correction by a prior art image forming apparatus, a lower portion of FIG. 23 represents operation of the density correction by the image forming apparatus 1 according to the first embodiment of the present invention, and a horizontal axis represents the process time. An upside-down triangle in FIG. 23 represents a time at which the density detection is performed. As illustrated in FIG. 23, the prior art image forming apparatus performs the density corrections twice including an adjustment of the development voltage and an adjustment of exposure time of light-emitting diode, and subsequently performs the gradation correction. Consequently, the process time of the prior art image forming apparatus becomes $2T_1+T_1$. On the other hand, the image forming apparatus 1 according to the first embodiment has the process time $T_2$ for the gradation correction in the shortening mode only, thereby shortening the process time.

FIG. 24 illustrates the comparison between the operations as similar to FIG. 23. A left portion of FIG. 24 represents the operation of the prior art density correction by the prior art image forming apparatus, a right portion of FIG. 24 represents the operation of the density correction by the image forming apparatus 1 according to the first embodiment, and a vertical axis represents an amount of toner consumption. Since the prior art image forming apparatus performs the density corrections twice including the adjustment of the development voltage and the adjustment of exposure time of light-emitting diode, followed by the gradation correction, the toner consumption amount becomes $2M_1+M_2$. The image forming apparatus of the first embodiment, on the other hand, has the toner consumption amount of $M_2$ for the gradation correction in the shortening mode only, thereby reducing the toner consumption amount.

Such a prior art image forming apparatus increases the toner consumption amount to print the density detection pattern, causing an increase in cost. However, the image forming apparatus according to the first embodiment can reduce a number of printing times of the density pattern, thereby reducing the toner consumption amount to print the density detection pattern.

Second Embodiment

According to the first embodiment described above, a number of printing times of the density detection pattern and a number of detection processes can be reduced, thereby shortening the density correction process time and reducing the toner consumption amount. In the first embodiment, however, where the difference between the actual print density and the target print density judged by the normal time density correction process judgment is greater than or equal to the reference value for any one of the colors, the normal density correction is performed. Herein, the normal density correction is even performed with respect to any color in which the density difference between the actual print density and the target print density is within the reference value, that is, the normal density correction is unnecessarily performed with respect to such a color. The second embodiment, therefore, further shortens the density correction process time or further reduces the toner consumption amount in comparison with the first embodiment in a case where the density difference increases or decreases depending on the color.

Figure 32:
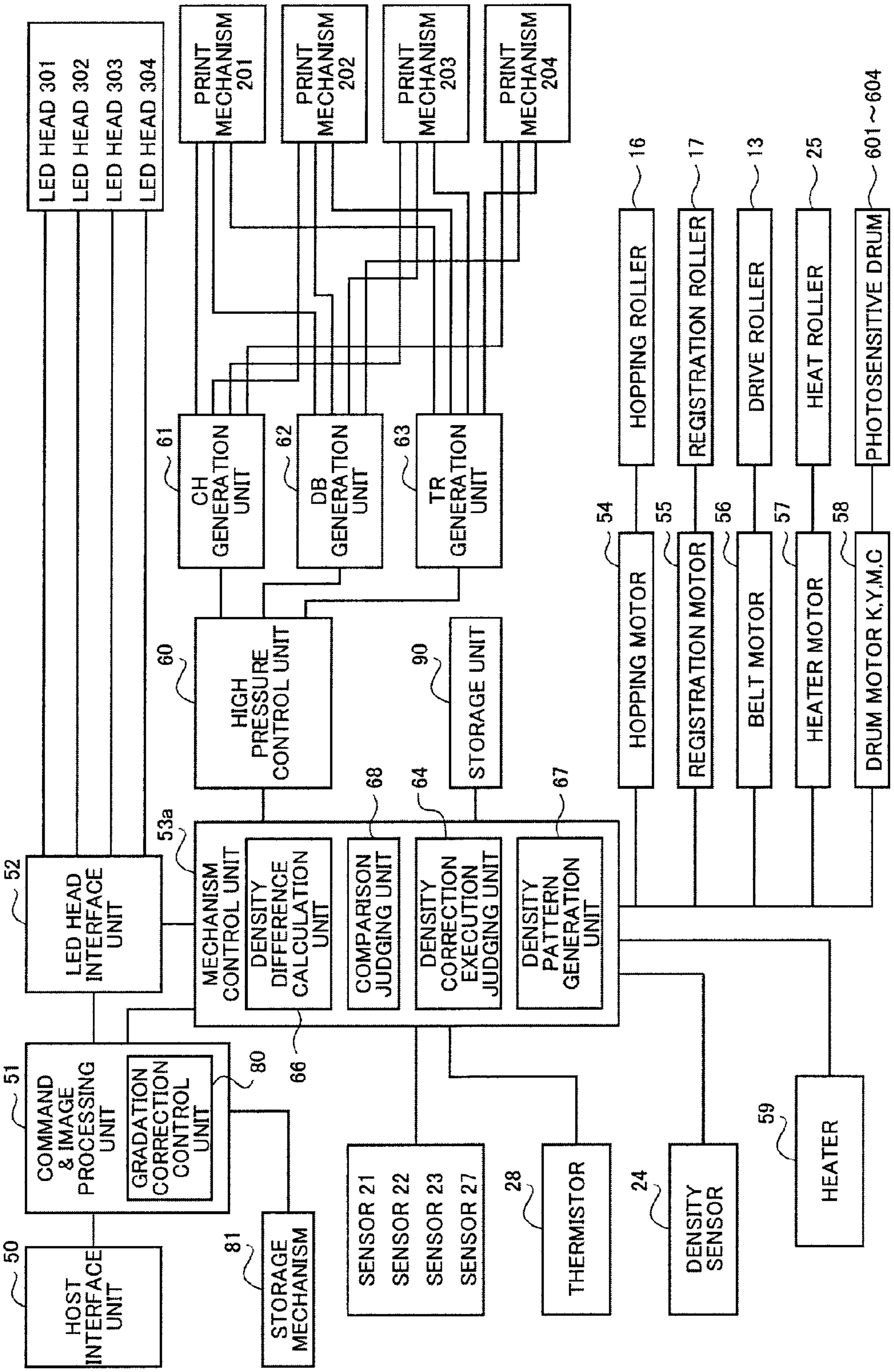
FIG. 32 is a block diagram illustrating a control system of an image forming apparatus according to a second embodiment of the present invention.

Referring to FIG. 32, a control circuit in an image forming apparatus 2 according to the second embodiment is illustrated in a block diagram. Since elements of the control circuit of the image forming apparatus 2 according to the second embodiment are substantially similar to those of the control circuit of the image forming apparatus 1 according the first embodiment described above except for a comparison judging unit 68 and a density pattern generation unit 67 of a mechanism control unit 53*a*, like elements will be given the same reference numerals as above and description thereof will be omitted. The mechanism control unit 53*a* includes the density pattern generation unit 67 and the comparison judging unit 68. The density pattern generation unit 67 of the mechanism control unit 53*a* includes a function generating a density detection pattern of a color only judged by the comparison judging unit 68 to be in need of the normal density correction process so that the image forming apparatus 2 of the second embodiment shortens the density correction process time or reduces the toner consumption amount. The comparison judging unit 68 and the density pattern generation unit 67 are described below.

The comparison judging unit 68 of the mechanism control unit 53*a* compares a density difference calculated by a density difference calculation unit 66 and a normal density correction execution judgment reference value stored in a storage mechanism 90, and judges whether to perform the normal density correction process with respect to each color. The density pattern generation unit 67 of the mechanism control unit 53*a* includes the function generating the density detection pattern of the particular color judged by the comparison judging unit 68 to be in need of the normal density correction process.

Figure 33:
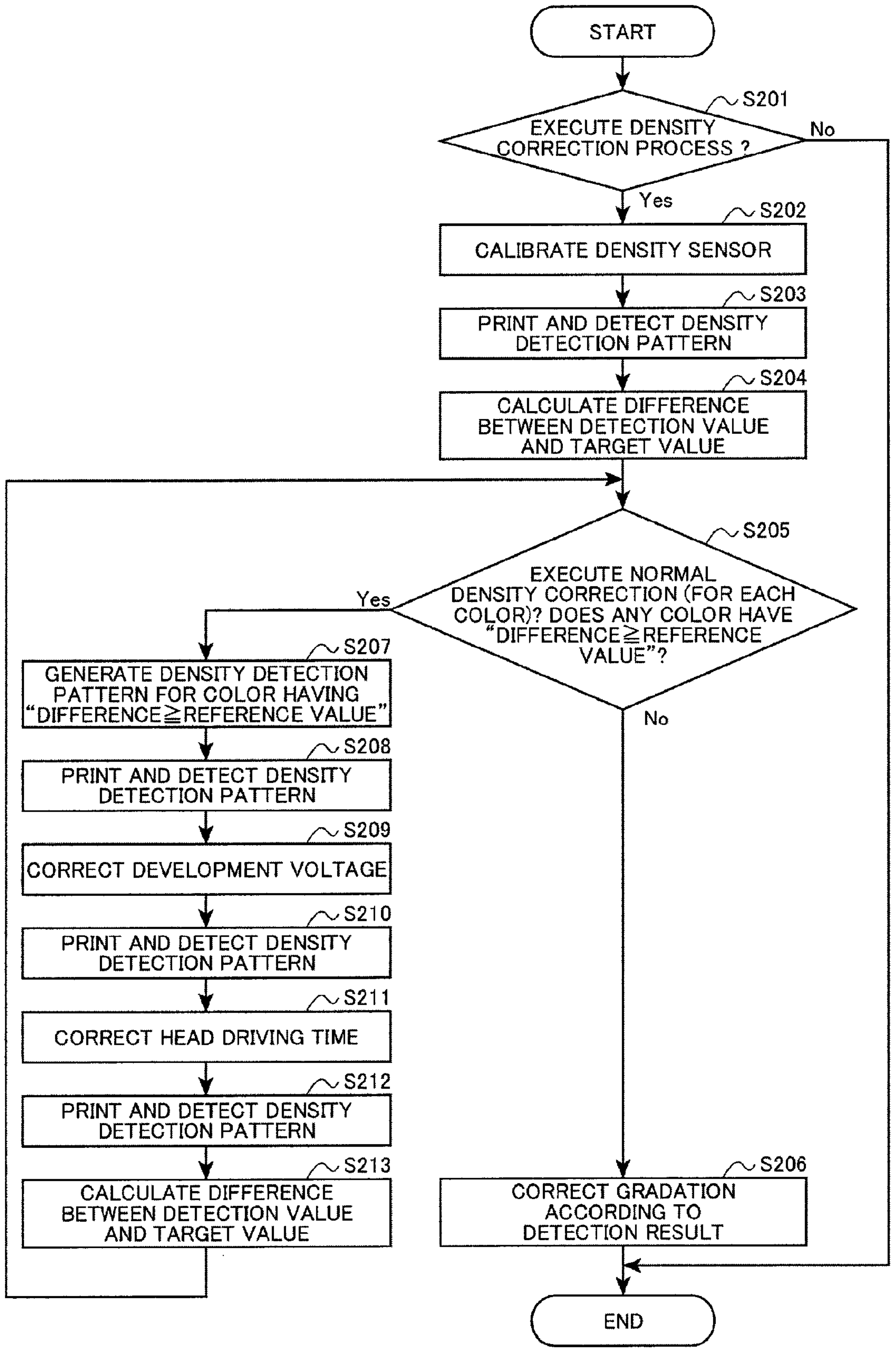
FIG. 33 is a flowchart illustrating an example procedure of a density correction by the image forming apparatus according to the second embodiment of the present invention.

Referring to FIG. 33, an example procedure of the density correction process according to the second embodiment is illustrated. In step S201 of the density correction process, a density correction execution judging unit 64 of the mechanism control unit 53*a* performs the density correction process execution judgment. Such a density correction process execution judgment of the second embodiment is substantially similar to that of the first embodiment. Where the density correction process is judged to be executed (Yes in step S201), flow proceeds to step S202. On the other hand, where the density correction process is judged not to be executed (No in step S201), the density correction process is finished.

Subsequently, in step S202 of the density correction process, a density sensor 24 is calibrated. In the calibration of the density sensor 24 according to the second embodiment, light-emitting electric current of an infrared-emitting diode 101 is adjusted to accommodate the variation in a mounting angle, a distance or temperature and the like of the density sensor 24 as similar to the first embodiment described above. Herein, the light-emitting electric current of the infrared-emitting diode 101 is adjusted with respect to an optional reference reflection member such that the output voltage of a phototransistor 102 for reception of specular reflection light and a phototransistor 103 for reception of diffuse reflection light is within a setting range.

In step S203, the mechanism control unit 53*a* begins to print a density detection pattern 112 illustrated in FIG. 12 stored beforehand in the storage mechanism 90 on a conveyance belt 12. The mechanism control unit 53*a* detects the density detection pattern 112 printed on the conveyance belt 12 by the density sensor 24, and reads the output voltage of each color pattern.

In step S204, the density difference calculation unit 66 of the mechanism control unit 53*a* calculates the difference based on the print density data read in step S203 and a target print density data table 85 stored in the storage mechanism 90 beforehand. A table value in the target print density data table 85 is experimentally determined such that ideal continuous gradation is reproduced as similar to a table value in a standard target gradation characteristic table 87.

In step S205 of the density correction process, the comparison judging unit 68 of the mechanism control unit 53*a* performs the normal density correction process execution judgment with respect to each color. The normal density correction process execution judgment allows comparison of the density difference with a normal time density correction execution judgment reference value table 86 stored beforehand in the storage mechanism 90, and the comparison judging unit 68 judges whether the color has the difference of smaller than the reference value or the color has the difference of greater than or equal to the reference value. Where the color has the difference of greater than or equal to the reference value (Yes in step S205), flow proceeds to step S207. The comparison judging unit 68 holds the print density data read of the color having the difference of smaller than or equal to the reference value.

Figure 34:
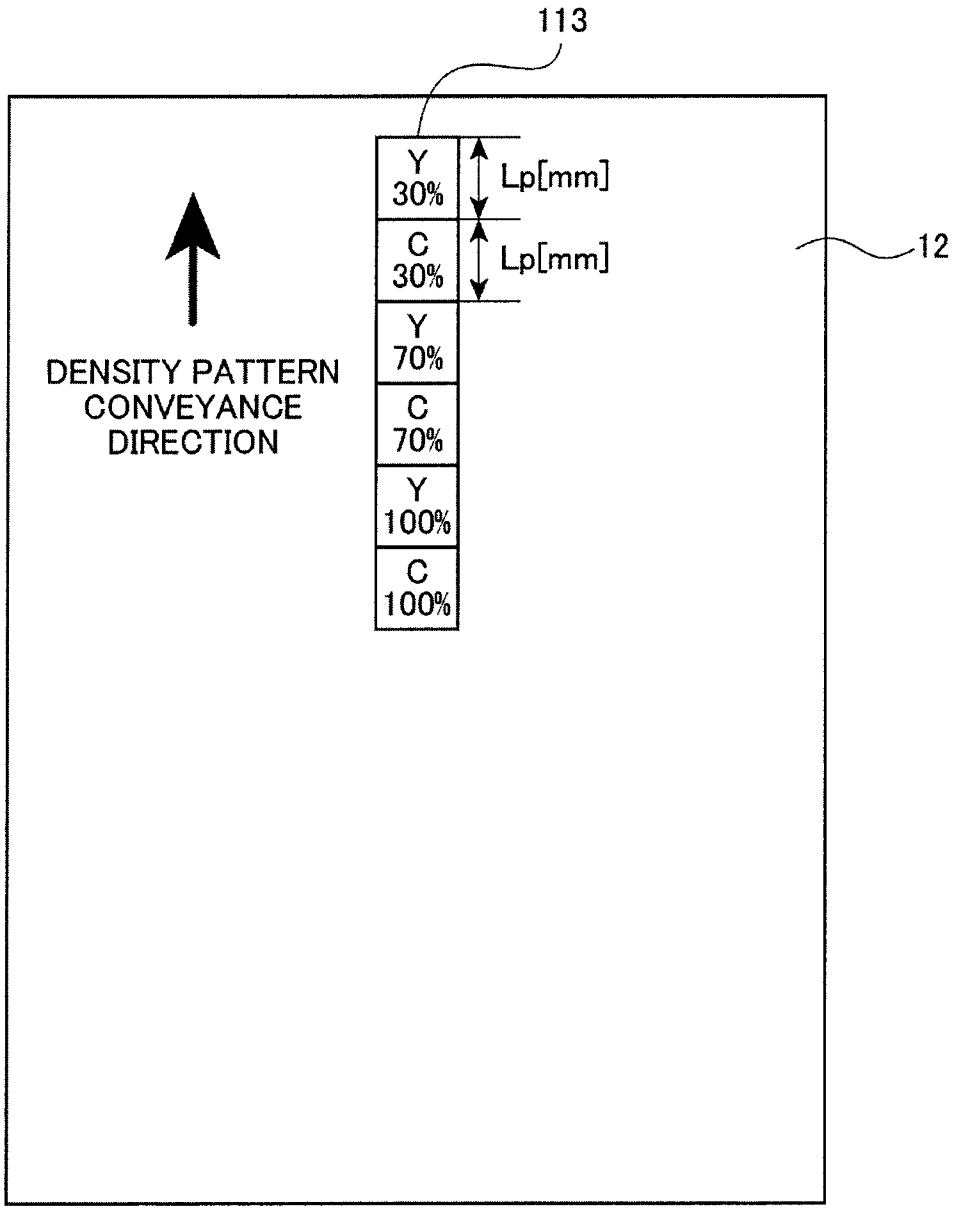
FIG. 34 is a schematic diagram illustrating an example of a density detection pattern of the image forming apparatus according to the second embodiment of the present invention.
Figure 35:
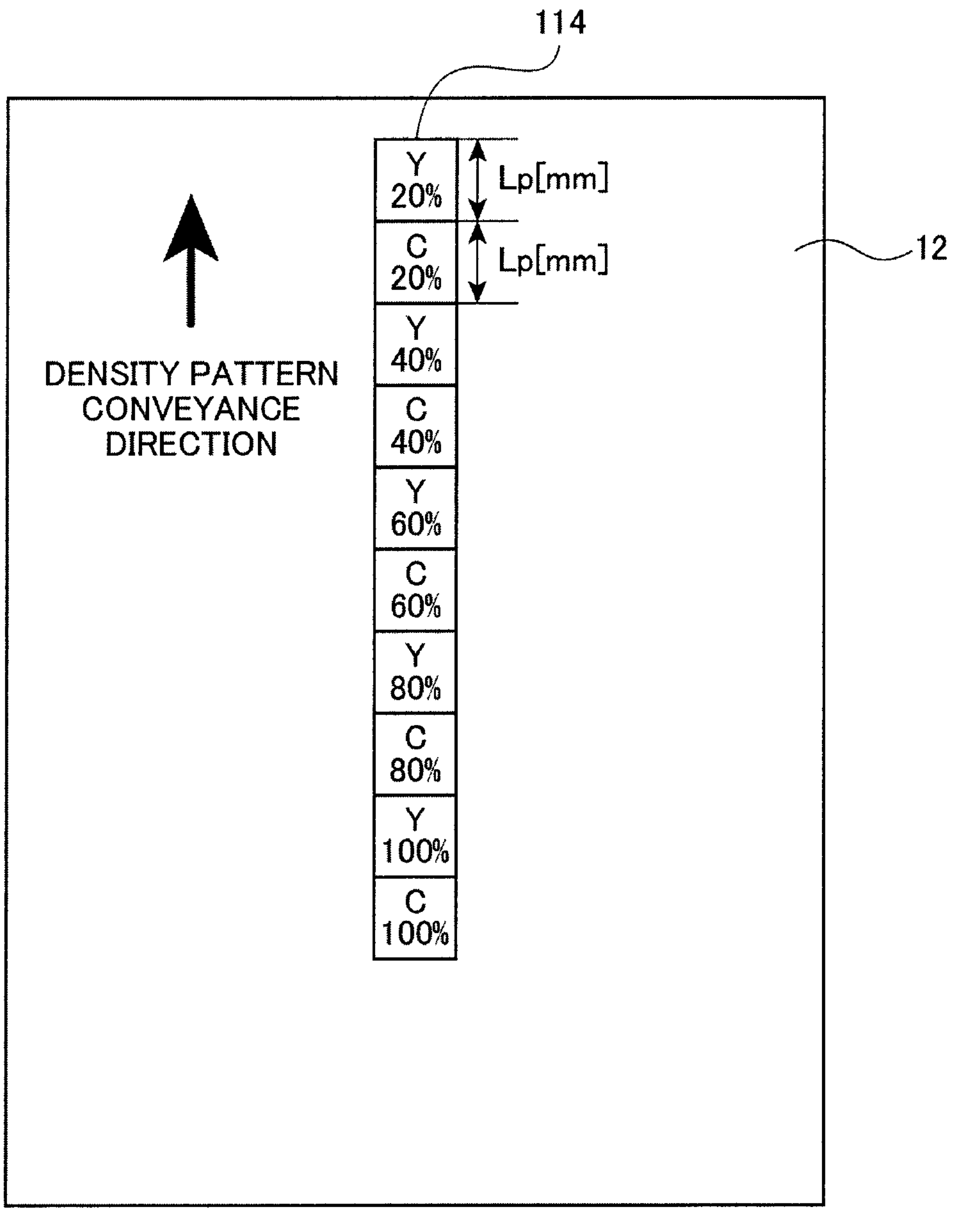
FIG. 35 is a schematic diagram illustrating another example of the density detection pattern of the image forming apparatus according to the second embodiment of the present invention.

In step S207 of the density correction process, the density pattern generation unit 66 generates the pattern data of the color having the difference of greater than or equal to the reference value. For example, where the colors having the difference of greater than or equal to the reference value are yellow and cyan, the density detection patterns are set as a density detection pattern 113 illustrated in FIG. 34 and a density detection pattern 114 illustrated in FIG. 35.

In step S208 through S211 of the density correction process, the development voltage and the LED driving time is corrected with respect to the color having the difference of greater than or equal to the reference value using the density detection pattern 113 generated in step S207. Such a correction made in step S208 through S211 is substantially similar to that made in step S3 through S6 of FIG. 4.

In step S212, the mechanism control unit 53*a* begins to print the density pattern on the conveyance belt 12 upon receiving the signal for execution of the density detection. For example, where the colors having the differences of greater than or equal to the reference values are yellow and cyan in step S205, the mechanism control unit 53*a* begins to print the density detection pattern 114 (illustrated in FIG. 35) generated in step S207 on the conveyance belt 12. The mechanism control unit 53*a* detects the density detection pattern 114 printed on the conveyance belt 12 by the density sensor 24 and reads the output voltage of each color pattern as similar to step S3 of FIG. 4.

In step S213, the density difference calculation unit 66 of the mechanism control unit 53*a* calculates the difference based on the print density data read in step S212 and the target print density data table 85 stored beforehand in the storage mechanism 90.

After each of steps S212 and 213, flow proceeds back to step S205. Where the difference of each of all colors is smaller than the reference value (No in step S205), flow proceeds to step S206 in which the gradation correction is performed.

In step S206 of the density correction process, the gradation correction control unit 80 receives the print data held by the comparison judging unit 68 in step S205. Such operation is substantially similar to step S8 of the detection correction process described above with reference to FIG. 4.

Figure 36:
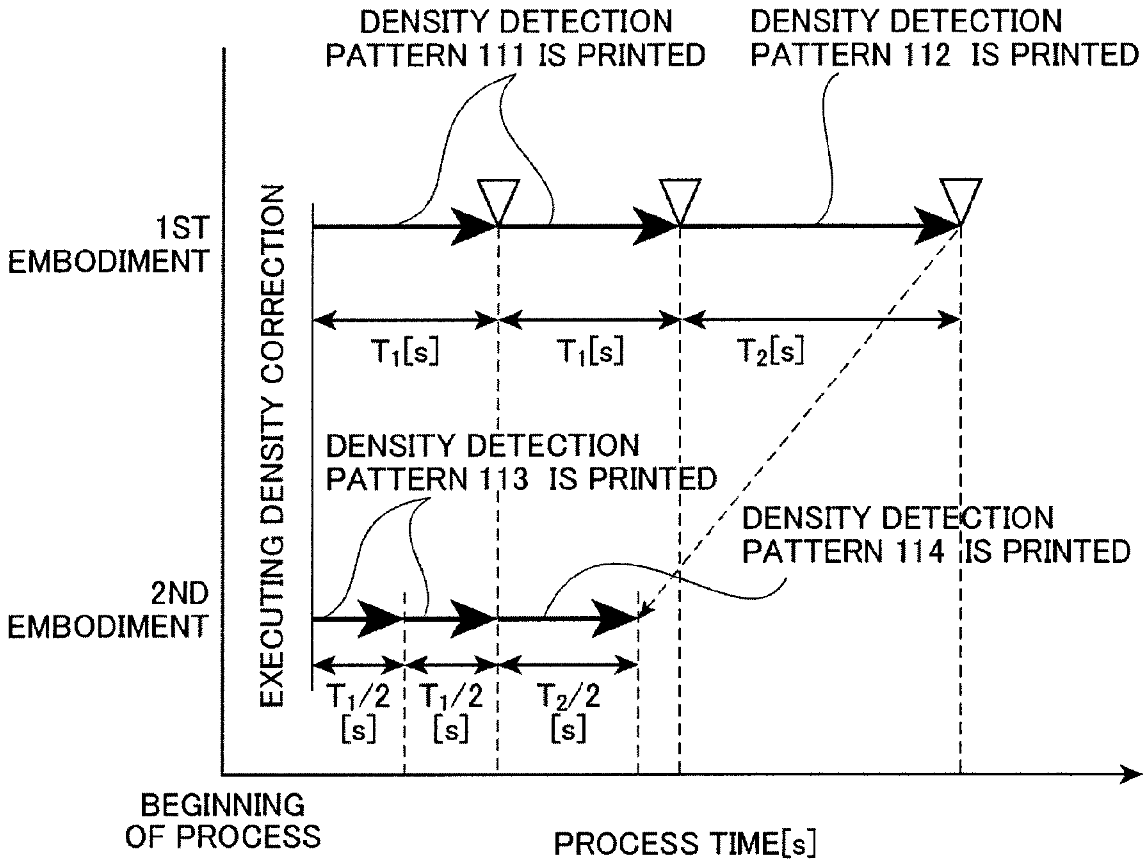
FIG. 36 is a time chart illustrating a comparison of process time between the image forming apparatus according to the second embodiment and the image forming apparatus of the first embodiment of the present invention.
Figure 37:
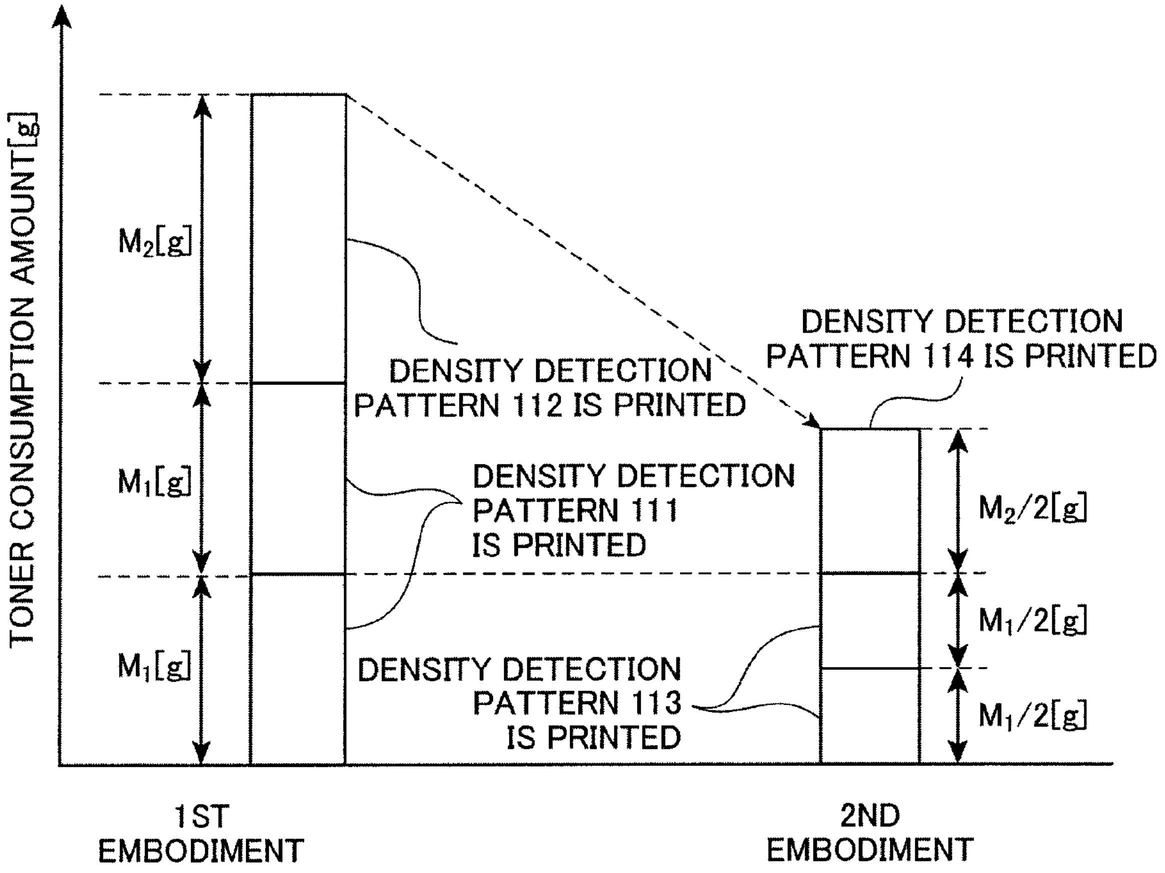
FIG. 37 is a schematic diagram illustrating a comparison of a toner consumption amount between the image forming apparatus according to the second embodiment and the image forming apparatus according to the first embodiment of the present invention.

According to the second embodiment as described above, the normal density correction is performed with respect to the color being in need of the normal density correction. Therefore, where at least one of the colors is in need of the density correction, the image forming apparatus 2 according to the second embodiment can shorten the density correction process time and can reduce the toner consumption amount to print the density detection pattern in comparison with the image forming apparatus 1 according to the first embodiment as illustrated in FIGS. 36 and 37. FIG. 36 illustrates the comparison of the density corrections between the first embodiment and the second embodiment where each of the density differences of the cyan and yellow, for example, exceeds the reference value. An upper portion of FIG. 36 represents the operation of the density correction according to the first embodiment, a lower portion represents the operation of the density correction according to the second embodiment, and a horizontal axis represents the process time. An upside-down triangle in FIG. 36 represents a time at which the density detection is performed. Since the image forming apparatus 1 of the first embodiment performs the density corrections for the four colors twice including the adjustment of the development voltage and the adjustment of the exposure time of light-emitting diode, followed by the gradation corrections for the four colors, the process time becomes $2T_1+T_2$. On the other hand, the image forming apparatus 2 of the second embodiment needs the process time for only two colors. Therefore, the process time of $T_1+T_2/2$ is needed for the density correction and the gradation correction for two colors by the image forming apparatus 2 according to the second embodiment, thereby reducing the process time in approximately half.

FIG. 37 illustrates the comparison between the operations as similar to FIG. 36. A left portion of FIG. 37 represents the operation of the density correction by the image forming apparatus 1 according to the first embodiment, a right portion of FIG. 37 represents the operation of the density correction by the image forming apparatus 2 according to the first embodiment, and a vertical axis represents the toner consumption amount. Since the image forming apparatus 1 according to the first embodiment performs the density corrections for the four colors twice including the adjustment of the development voltage and the adjustment of exposure time of light-emitting diode, followed by the gradation correction, the toner consumption amount becomes $2M_1+M_2$. The image forming apparatus 2 according to the second embodiment, on the other hand, performs the density correction and the gradation correction for two colors and consumes the toner amount of $2M_1+M_2/2$, thereby reducing the toner consumption amount.

According to each of the first and second embodiments described above, the development voltage and the LED driving time is corrected as a manner of the density correction, but is not limited thereto. Alternatively, photosensitive drum potential may be corrected. According to each of the first and second embodiments described above, the LED head serves as a latent image forming mechanism. However, the latent image forming mechanism is not limited to the LED head. Alternatively, a laser light source and the like may be employed as the latent image forming mechanism. According to each of the first and second embodiments described above, the image forming units are disposed from the upstream side in the sheet conveyance direction in sequence of black, yellow, magenta, and cyan. However, the sequence of the image forming units is not limited thereto in a case of an image forming apparatus having a plurality to the image forming units for multi-color toners. For example, the image forming units for the color of cyan may be disposed in the most upstream side. According to the first and second embodiments described above, each of the image forming apparatuses 1 and 2 includes the four image forming units. However, a number of the image forming units is not limited thereto. Each of the first and second embodiments may be applied to an image forming apparatus having a plurality of image forming units and an image forming apparatus having one image forming unit for a single color, for example, black.

As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An image forming apparatus, having an image forming unit, capable of forming a gradation image, the image forming apparatus comprising:

a density detection unit detecting a gradation image density of the gradation image formed by the image forming unit;

a gradation correction control unit controlling a change of a gradation characteristic according to a detection result of the density detection unit; and a mechanism control unit controlling operation of the gradation correction control unit and controlling a change of a physical characteristic of the image forming unit according to the detection result of the density detection unit, wherein the mechanism control unit includes:

a density difference calculation unit calculating a density difference between target image density of an image to be formed by the image forming unit and the image density; and a comparison judging unit comparing the density difference calculated by the density difference calculation unit with a reference value serving as a value in a prescribed range value from the target image density of the image density, and judging execution of the change of the gradation characteristic and the change of the physical characteristic where the density difference is greater than the reference value and judging the execution of the change of the gradation characteristic without changing the physical characteristic where the density difference is smaller than or equal to the reference value, wherein the mechanism control unit arranges the comparison judging unit to be active or inactive, wherein inactivation of the comparison judging unit can switch density correction process to a normal mode, and activation of the comparison judging unit can switch the density correction process to a shortening mode, wherein a switching selection between the normal mode and the shortening mode is switched by a user, wherein the density correction process in the shortening mode is performed in a case where density change corresponds to a predetermined condition, and wherein the density correction process in the shortening mode can be performed immediately after the density correction process in the normal mode is performed.

2. The image forming apparatus according to claim 1 comprising a storage unit storing the target image density and the reference value.

3. The image forming apparatus according to claim 1, wherein the gradation image is a multi-color gradation image, and wherein the mechanism control unit allows the density correction unit to operate with respect to each color where the density difference, between the image density and the target print density, of any one of the plural colors in the gradation image detected by the density detection unit becomes greater than or equal to the reference value.

4. The image forming apparatus according to claim 1, wherein the gradation image includes a plurality of colors, and wherein, the mechanism control unit controls the change of the image density of a color only in which the density difference between the image density and the target image density is greater than or equal to the reference value.

5. The image forming apparatus according to claim 1, wherein the image forming unit includes a development bias generation unit generating development bias to be applied to an image carrier carrying developer, and wherein a density correction unit changes the image density by adjusting the development bias serving as development voltage according to the detection result of the density detection unit.

6. The image forming apparatus according to claim 1, wherein the image forming unit includes an image carrier forming an electrostatic latent image thereon by being irradiated by driving of a light-emitting element, and wherein a density correction unit changes the image density by adjusting a driving time of the light-emitting element according to the detection result of the density detection unit.

7. The image forming apparatus according to claim 2, wherein the storage unit stores standard target gradation characteristic data, and wherein the gradation correction unit performs a correction based on comparison between the standard target gradation characteristic data and the detection result of the density detection unit.

8. The image forming apparatus according to claim 1, wherein the mechanism control unit further includes a density correction execution judging unit, and wherein the density correction execution judging unit allows the image forming unit to form the gradation image at a prescribed timing and detects the gradation image density by the density detection unit.

9. A density correction method for correcting an image density, the method comprising the steps of:

printing a prescribed density detection pattern;

detecting a density detection value from the printed prescribed density detection pattern;

calculating a density difference between the density detection value and a target value;

comparing the calculated density difference with a reference value serving as a prescribed range value based on the target value;

determining whether to execute a density correction process to a first correction target without executing the density correction process to a second correction target or to execute the density correction process to the first and the second correction targets, according to the comparison result of the comparing step, correcting density with respect to the determined correction target, wherein the first correction target and the second correction target are different from each other.

10. The density correction method according to claim 9, wherein the correcting step is performed with respect to each color to be printed.

11. The density correction method according to claim 9, further comprising the step of forming a multi-color gradation image.

12. The density correction method according to claim 9, wherein the prescribed density detection pattern includes a multi-color gradation image.

13. The density correction method according to claim 9, further comprising the step of controlling a change of image density of a color in which the density difference between the density detection value and the target value is greater than or equal to the reference value.

14. The density correction method according to claim 9, further comprising the steps of:

generating a development bias to be applied to an image carrier carrying developer; and changing image density by adjusting the development bias serving as development voltage according to the detection result of the density detection unit.

15. The density correction method according to claim 9, further comprising the steps of:

forming an electrostatic latent image on an image carrier by driving of a light-emitting element; and changing image density by adjusting a driving time of the light-emitting element according to the detection result of the density detection unit.

16. The density correction method according to claim 9, wherein the first correction target and the second correction target are different in a type of correction target.

17. The density correction method according to claim 9, wherein the gradation image includes a plurality of colors, and wherein, the mechanism control unit controls the change of the image density of a color only in which the density difference between the image density and the target image density is greater than or equal to the reference value by repeating the density correction process till the difference of each of all colors becomes smaller than the reference value.

18. The density correction method according to claim 17, wherein the comparison judging unit holds the print density data read of the color having the difference of smaller than the reference value, and use the print density data for a gradation correction process.

19. The density correction method according to claim 9, wherein in the comparison step, performing a density correction process with respect to the first and second correction targets in a case where the density difference is greater than or equal to the reference value, and performing the density correction process with respect to the first correction target in a case where the density difference is smaller than the reference value.

20. The density correction method according to claim 9, wherein the first correction target is an image process characteristic for forming the image, and wherein the second correction target is the image process characteristic for forming the image and a physical characteristic of a mechanism for forming the image.

21. The density correction method according to claim 20, wherein the image process characteristic is a gradation characteristic.

22. The density correction method according to claim 9, wherein the density difference is changed by correcting the first correction target, and wherein the density difference is changed by correcting the second correction target.

* * * * *